US009231725B2

(12) United States Patent
Giorgi et al.

(10) Patent No.: US 9,231,725 B2
(45) Date of Patent: Jan. 5, 2016

(54) PASSIVE OPTICAL NETWORK OPTICAL NETWORK TERMINAL APPARATUS AND CONFIGURATION METHOD

(75) Inventors: Luca Giorgi, Ponsacco (IT); Fabio Cavaliere, Vecchiano (IT)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 92 days.

(21) Appl. No.: 14/112,789

(22) PCT Filed: Apr. 20, 2011

(86) PCT No.: PCT/EP2011/056320
§ 371 (c)(1),
(2), (4) Date: Oct. 18, 2013

(87) PCT Pub. No.: WO2012/143046
PCT Pub. Date: Oct. 26, 2012

(65) Prior Publication Data
US 2014/0233953 A1    Aug. 21, 2014

(51) Int. Cl.
*H04B 10/00* (2013.01)
*H04J 14/02* (2006.01)

(52) U.S. Cl.
CPC .......... *H04J 14/0227* (2013.01); *H04J 14/025* (2013.01); *H04J 14/0246* (2013.01); *H04J 14/0258* (2013.01); *H04J 14/0267* (2013.01); *H04J 14/0269* (2013.01); *H04J 14/0282* (2013.01); *H04J 14/0293* (2013.01)

(58) Field of Classification Search
CPC ............. H04J 14/0227; H04J 14/0241; H04J 14/0242; H04J 14/0245; H04J 14/0246; H04J 14/0249; H04J 14/025
See application file for complete search history.

(56) References Cited

U.S. PATENT DOCUMENTS

2004/0179855 A1    9/2004  Harada
2008/0166127 A1*   7/2008  Kazawa et al. ................. 398/79

FOREIGN PATENT DOCUMENTS

EP    0 438 155 A2    7/1991
EP    0 810 752 A2    12/1997

OTHER PUBLICATIONS

Chinese Office Action issued in Chinese Patent Application No. 201180070235.2 on Aug. 26, 2015, 13 pages.

* cited by examiner

*Primary Examiner* — Daniel Dobson
(74) *Attorney, Agent, or Firm* — Rothwell, Figg, Ernst & Manbeck, P.C.

(57) ABSTRACT

A method of configuring an optical network terminal, ONT, of a wavelength division multiplexed passive optical network, WDM PON. Sequentially setting a transmission wavelength of a tunable optical filter at the ONT to one or more wavelengths of a pre-selected plurality of transmission wavelengths until a wavelength is identified for which no downstream optical signal from an optical line terminal of the WDM PON is detected. Determining whether a transmitter operable at said identified transmission wavelength is present at the OLT and is available to be assigned to communicate with the ONT. If a transmitter is determined to be present and available, maintaining the transmission wavelength of the tunable optical filter at transmission wavelength and assigning the ONT to the OLT as a subscriber at said identified transmission wavelength. If a transmitter is determined to be one of not present and not available, recommencing the method.

17 Claims, 17 Drawing Sheets

PASSIVE OPTICAL NETWORK OPTICAL NETWORK TERMINAL APPARATUS AND CONFIGURATION METHOD

CROSS REFERENCE TO RELATED APPLICATION(S)

This application is a 35 U.S.C. §371 National Phase Entry Application from PCT/EP2011/056320, filed Apr. 20, 2011, designating the United States, the disclosure of which is incorporated herein in its entirety by reference.

TECHNICAL FIELD

The invention relates to a method of configuring an optical network terminal of a wavelength division multiplexed passive optical network. The invention further relates to an optical network terminal for a wavelength division multiplexed passive optical network. The invention further relates to a passive optical network.

BACKGROUND

Wavelength division multiplexed passive optical networks, WDM PON, dramatically increase the capacity of fibre links compared to other fibre access techniques. Using dedicated wavelengths for each connection between a subscriber and the central office, the current technology allows 96 1 Gigabit Ethernet (GbE) connections to be established on the same optical fibre.

Several WDM PON system architectures and transmission techniques have been proposed to lower the cost or increase the performance of a WDM PON which require the use at the subscriber side of an optical network termination, ONT, that can be operated at any selected wavelength (a "colourless" ONT). There are basically two ways to implement a colourless ONT: sending the optical carrier signal to the ONT from a remote node (typically, the Central Office); and locally generating the optical carrier signal at the ONT by means of a tunable laser.

Many telecom operators are requiring the compatibility of WDM PON equipment with deployed PON infrastructure. A WDM PON ONT which is compatible with deployed PON infrastructure, which has distribution node simply comprising a power splitter, must comprise a tunable filter in order to select the respective working wavelength for each ONT, such as described by Murano et al, "Tunable GPON receivers enable phased migration to 1 Gb/s per subscriber", OFC 2009. The transmission wavelength of the tunable filter must be set to the respective working wavelength for each ONT, which is currently done manually.

SUMMARY

It is an object to provide an improved method of configuring an optical network terminal of a wavelength division multiplexed passive optical network. It is a further object to provide an improved optical network terminal for a wavelength division multiplexed passive optical network. It is a further object to provide an improved passive optical network.

A first aspect of the invention provides a method of configuring an optical network terminal of a wavelength division multiplexed passive optical network. The method comprises:
a. Sequentially setting a transmission wavelength of a tunable optical filter at the optical network terminal to one or more wavelengths of a pre-selected plurality of transmission wavelengths. Sequentially setting the transmission wavelength until a said wavelength is identified for which no downstream optical signal from an optical line terminal of the wavelength division multiplexed passive optical network is detected;
b. Determining whether a transmitter operable at said identified transmission wavelength is present at the optical line terminal. Further determining whether said transmitter is available to be assigned to communicate with the optical network terminal;
c. If a said transmitter is determined to be present and available, maintaining the transmission wavelength of the tunable optical filter at said identified transmission wavelength. Assigning the optical network terminal to the optical line terminal as a subscriber at said identified transmission wavelength; and
d. If a said transmitter is determined to be one of not present and not available, recommencing the method at step a. for one or more further wavelengths of said pre-selected plurality of wavelengths.

The method may therefore enable the wavelength of the tunable filter to be set automatically, both for initial set up of the ONT and following a change of the wavelength allocation plan of the WDM PON, without the network operator being required to send information setting the working wavelength for an ONT to the respective subscriber. This may reduce the risk of interception and disturbance of other subscriber wavelength channels. It may also reduce the likelihood of the tunable filter transmission wavelength being set incorrectly and may enable a subscriber ONT to be added to a WDM PON by a non-expert user.

The method may enable a WDM PON ONT including a tunable filter to self-adjust its working wavelength both at transmission and receiver side. The method may be used in relation to colourless ONTs based on tunable lasers and those based on reflective semiconductor optical amplifiers, RSOAs.

The method may enable the full reuse of deployed gigabit-capable passive optical network, GPON, infrastructure for upgrade to WDM PON or for co-existence of WDM PON within an existing GPON infrastructure. The method may be used with any kind of colorless ONT used on a PON infrastructure where a tunable filter transmission wavelength is required to be set.

The optical line terminal, OLT, transmitter is shut down when there is no assigned ONT or the assigned ONT is silent and the method may therefore reduce energy consumption at the OLT. The method acts only the physical layer of a WDM PON and is independent of the transmission protocol or standard used. The method may enable fast and automatic reallocation of working wavelength in the case where connection ports are swapped, at the central office.

In an embodiment, step a. comprises:
i. Determining whether the optical network terminal has a previously set tunable optical filter transmission wavelength;
ii. If there is a previously set wavelength, setting the transmission wavelength of the tunable optical filter to said previously set wavelength; and otherwise
iii. Sequentially setting a transmission wavelength of a tunable optical filter at the optical network terminal to one or more wavelengths of a pre-selected plurality of transmission wavelengths. Sequentially setting the transmission wavelength until a said wavelength is identified for which no downstream optical signal from an optical line terminal of the wavelength division multiplexed passive optical network is detected.

In this embodiment step d. comprises, if a said transceiver transmitter is determined to be one of not present and not available, recommencing the method at step iii. for one or more further wavelengths of said pre-selected plurality of wavelengths.

This may enable an ONT which has been silent to recommence communication with the OLT at a previously allocated operating wavelength. It may also reduce the time required for an ONT to recommence communication.

In an embodiment, each of step a. and step iii. comprises sequentially setting the transmission wavelength of the tunable optical filter at the optical network terminal to one or more wavelengths of the pre-selected plurality of transmission wavelengths. Each of step a. and step iii. further comprises sequentially setting the transmission wavelength of the tunable optical filter until the transmission wavelength is set to a said wavelength for which a first loss of signal alarm having a high alarm condition is received.

The method may therefore make use of existing alarm signalling within a network in order to identify an available wavelength.

In an embodiment, step b. comprises:
A. At the optical network terminal, generating an upstream optical signal. Transmitting the upstream optical signal to the optical line terminal;
B. At the optical line terminal, determining whether a said upstream optical signal has been detected. If a said upstream optical signal has been detected generating a further downstream optical signal. Transmitting the further downstream optical signal to the optical network terminal;
C. At the optical network terminal, waiting for a time at least as long as a round trip time from the optical network terminal to the optical line terminal and back. Determining whether a said further downstream optical signal has been received; and
D. If a said further downstream optical signal is determined to have been received, generating and transmitting a first control signal. The first control signal comprises an indication that said transmitter is present and available;
E. If no said further downstream optical signal is determined to have been received, generating and transmitting a second control signal. The second control signal comprises an indication that said transmitter is one of not present and not available.

The method may thereby verify that communications can be established between the ONT and the OLT, and may enable the ONT to automatically determine whether the OLT is present and available for communication.

In an embodiment, in step B. a said upstream optical signal is determined as having been detected if a second loss of signal alarm having a low alarm condition is received at the optical line terminal. In step C. a said further downstream optical signal is determined as having been received if a third loss of signal alarm having a low alarm condition is received at the optical network terminal.

The method may therefore make use of existing alarm signalling within a network in order to determine receipt of respective optical signals at the ONT and the OLT.

In an embodiment, the upstream optical signal comprises an upstream identification modulation sequence. Step B. comprises the upstream optical signal being detected by, at the optical line terminal, performing an autocorrelation of a received upstream optical signal with a stored upstream identification modulation sequence. Step B further comprises generating an upstream autocorrelation indicator and comparing said indicator with an upstream threshold indicator.

Step B further comprises if said indicator is greater than or equal to the upstream threshold indicator, generating a said further downstream optical signal comprising an indication that a said upstream optical signal has been detected.

This may enable the method to be used in the presence of very high splitting ratios at the distribution node (e.g. 1:128), when high link loss and thus low signal power would otherwise make it difficult for the OLT to detect the presence of an upstream optical signal and thus detect the present of an active ONT. The method may thus be used to detect the presence of an upstream optical signal even when the optical signal power received at the OLT is below a receiver sensitivity of the OLT or below the loss of signal alarm threshold.

In an embodiment, step B. further comprises waiting for a time at least as long as a round trip time from the optical line terminal to the optical network terminal and back, and determining whether a further upstream optical signal has been received. If a further upstream optical signal is received, commencing transmission of a traffic carrying downstream optical signal at said identified transmission wavelength. If a further upstream optical signal is not received, determining whether the optical network terminal has already been assigned to the optical line terminal as a subscriber at a different said transmission wavelength. If the optical network terminal has already been assigned to the optical line terminal, stopping transmission of said downstream optical signal at said identified transmission wavelength. If the optical network terminal has not already been assigned to the optical line terminal, commencing transmission of a said traffic carrying downstream optical signal at said identified transmission wavelength.

The OLT may therefore verify whether the ONT has already been assigned to the OLT as a subscribed at a different wavelength before commencing downstream traffic transmission to the ONT.

In an embodiment, each said downstream optical signal comprises a downstream identification modulation sequence. Each of step a., step iii. and step C. further comprise, if a respective loss of signal alarm having a high alarm condition is received, performing an autocorrelation of an optical signal received at the optical network terminal with a stored downstream identification modulation sequence. In each of step a., step iii. and step C. a downstream autocorrelation indicator is then generated and said indicator is compared with a downstream threshold indicator. If said indicator is greater than or equal to the downstream threshold indicator, each of step a., step iii and step C further comprise generating and transmitting a third control signal comprising an indication that said received optical signal comprises a downstream optical signal.

This may enable an ONT based on wavelength reuse to be configured using this method. Carrying out autocorrelation of a received optical signal may enable a upstream optical signals of low power, such as those generated using an ONT based on wavelength reuse, to be detected.

In an embodiment, each said identification modulation sequence comprises a pseudo random binary sequence arranged to provide a high autocorrelation value when correlated with itself and to provide an autocorrelation value of substantially zero when correlated with a different modulation sequence. The average autocorrelation value may thus be insensitive to any signal different from the identification modulation sequence and increase each time an identification modulation sequence is detected.

In an embodiment, step c. comprises determining whether the optical network terminal has a previously set tunable optical filter transmission wavelength. If there is a previously set wavelength, step c. further comprises maintaining the transmission wavelength of the tunable optical filter at said previously set wavelength at the optical network terminal. And at the optical line terminal the optical network terminal is assigned to the optical line terminal as a subscriber at said previously set wavelength. If there is not a previously set wavelength, step c. further comprises further determining whether a transmitter operable at said identified transmission wavelength is present at the optical line terminal and is available to be assigned to communicate with the optical network terminal. Step c. further comprises, if a said transmitter is determined to be present and available, storing said identified transmission wavelength and maintaining the transmission wavelength of the tunable optical filter at said identified transmission wavelength. At the optical line terminal the optical network terminal is assigned to the optical line terminal as a subscriber at said identified transmission wavelength. Step c. further comprises, if a said transmitter is determined to be one of not present and not available, recommencing the method at step a. for one or more further wavelengths of said pre-selected plurality of wavelengths. This may reduce the time required to configure an ONT which has been used previously and which has a previously set wavelength, since the identification of an available wavelength does not need to be carried out in that case.

In an embodiment, in step c. the existence of a previously set tunable optical filter transmission wavelength is determined by inspecting a first memory store for a memory flag comprising an indicator that the optical network terminal has previously been powered on. Step c. further comprises, if a said memory flag is present, retrieving a said previously set tunable optical filter transmission wavelength from a second memory store.

In an embodiment, the method further comprises, if the optical network terminal is powered off, removing the memory flag from the first memory store. In an embodiment, the method further comprises, if the optical network terminal is powered off, removing the previously set tunable optical filter transmission wavelength from the second memory store. This may ensure that an ONT is not configured at a previously set wavelength which may not be appropriate or available for assignment at a new location.

In an embodiment, step c. further comprises generating and transmitting at least one of an optical network terminal control signal and an optical line terminal control signal. The optical network terminal control signal is arranged to cause the optical network terminal to commence transmission of a traffic carrying upstream optical signal at said maintained transmission wavelength of the tunable optical filter. The optical line terminal control signal is arranged to cause the optical line terminal to commence transmission of a traffic carrying downstream optical signal at said maintained transmission wavelength of the tunable optical filter.

In an embodiment, the upstream optical signal has a first bit rate. The optical network terminal control signal is further arranged to cause the optical network terminal to commence transmission of said traffic carrying upstream optical signal at a second, higher bit rate. Reducing the bit rate of the upstream optical signal used in step b. as compared to the bit rate to be used during transmission of traffic following configuration of the ONT may correspondingly reduce the required receiver sensitivity at the OLT. This may enable the method to be used to configure an ONT based on wavelength reuse.

In an embodiment, the optical network terminal comprises an optical transmitter comprising a tunable laser. Step c. further comprises generating and transmitting a laser wavelength control signal arranged to cause the tunable laser to operate at said maintained transmission wavelength of the tunable optical filter. The operating wavelength of the tunable laser may therefore be automatically adjusted to match the transmission wavelength of the tunable filter. The tunable filter settings may therefore be used also to adjust the transmission wavelength of the ONT.

In an embodiment, the method is initiated by the optical network terminal. The method may therefore be triggered by the ONT with the OLT comprising the master unit of the WDM PON due to it implementing the assignment of the ONT as a subscriber to the OLT at the identified wavelength.

A second aspect of the invention provides an optical network terminal for a wavelength division multiplexed passive optical network. The optical network terminal comprises an optical receiver, an optical transmitter, a tunable optical filter and a controller. The optical receiver is arranged to detect a downstream optical signal. The optical transmitter arranged to generate and transmit an upstream optical signal. The tunable optical filter has a tunable transmission wavelength and is arranged to receive a downstream optical signal. The tunable optical filter is further arranged to transmit to the optical receiver any said received downstream optical signal at a selected said transmission wavelength. The controller is arranged to:

a. Sequentially generate and transmit one or more wavelength control signals arranged to set the transmission wavelength of the tunable optical filter to a respective one or more wavelengths of a pre-selected plurality of transmission wavelengths until a said wavelength is identified for which no downstream optical signal is detected;

b. Determine whether a transmitter operable at said identified transmission wavelength is present at an optical line terminal of the wavelength division multiplexed passive optical network and is available to be assigned to communicate with the optical network terminal;

c. If a said transmitter is determined to be present and available, maintain the transmission wavelength of the tunable optical filter at said identified transmission wavelength; and d. If a said transmitter is determined to be one of not present and not available, recommence step a. for one or more further wavelengths of said pre-selected plurality of wavelengths.

The wavelength of the ONT tunable filter may be set automatically, both for initial set up of the ONT and following a change of the wavelength allocation plan of a WDM PON of which it forms a part, without the network operator being required to send information setting the working wavelength for an ONT to the respective subscriber. This may reduce the risk of interception and disturbance of other subscriber wavelength channels. It may also reduce the likelihood of the tunable filter transmission wavelength being set incorrectly and may enable a subscriber ONT to be added to a WDM PON by a non-expert user.

The ONT may be used to upgrade all or part of a deployed gigabit-capable passive optical network, GPON, infrastructure for to WDM PON.

In an embodiment, step a. comprises:

i. Determining whether the optical network terminal has a previously set tunable optical filter transmission wavelength;

ii. If there is a previously set wavelength, setting the transmission wavelength of the tunable optical filter to said previously set wavelength; and otherwise iii. Sequentially setting a transmission wavelength of the tunable optical filter to one or more wavelengths of a pre-selected plurality of transmission wavelengths. Sequentially setting the transmission wavelength until a said wavelength is identified for which no downstream optical signal from an optical line terminal of the wavelength division multiplexed passive optical network is detected.

In this embodiment step d. comprises, if a said transceiver transmitter is determined to be one of not present and not available, recommencing the method at step iii. for one or more further wavelengths of said pre-selected plurality of wavelengths.

This may enable the ONT to recommence communication with an OLT following a period of silence, during which the ONT is not transmitting, at a previously allocated operating wavelength. It may also reduce the time required for the ONT to recommence communication.

In an embodiment, each of step a. and step iii. comprises sequentially setting the transmission wavelength of the tunable optical filter to one or more wavelengths of the pre-selected plurality of transmission wavelengths. Each of step a. and step iii. further comprises sequentially setting the transmission wavelength of the tunable optical filter until the transmission wavelength is set to a said wavelength for which a first loss of signal alarm having a high alarm condition is received. The ONT may therefore make use of existing alarm signalling within a network in order to identify an available wavelength.

In an embodiment, step b. comprises:
A. Generating an upstream optical signal and transmitting the upstream optical signal to the optical line terminal;
C. Waiting for a time at least as long as a round trip time from the optical network terminal to the optical line terminal and back. Determining whether a further downstream optical signal has been received from the optical line terminal; and
D. If a said further downstream optical signal is determined to have been received, generating and transmitting a first control signal. The first control signal comprises an indication that said transmitter is present and available;
E. If no said further downstream optical signal is determined to have been received, generating and transmitting a second control signal. The second control signal comprises an indication that said transmitter is one of not present and not available.

The ONT may thereby verify that it is permitted to establish communications an OLT, and may enable the ONT to automatically determine whether an OLT is present and available for communication.

In an embodiment, in step C. a said further downstream optical signal is determined as having been received if a third loss of signal alarm having a low alarm condition is received at the optical network terminal. The ONT may therefore make use of existing alarm signalling within a network in order to verify that an OLT is available at an identified wavelength.

In an embodiment, the upstream optical signal comprises an upstream identification modulation sequence. This may enable the OLT to perform an autocorrelation on a received upstream optical signal, which may enable an OLT to detect the presence of an upstream optical signal and thus detect the presence of the ONT when high link loss in the WDM PON, and thus low signal power received at the OLT, would otherwise make it difficult for the OLT to detect the ONT. The upstream optical signal may therefore be detected by an OLT even when the optical signal power received at the OLT is below a receiver sensitivity of the OLT or below the loss of signal alarm threshold.

In an embodiment, each said downstream optical signal comprises a downstream identification modulation sequence. The optical network terminal further comprises autocorrelation apparatus provided after the optical received. The autocorrelation apparatus is arranged to perform an autocorrelation of an optical signal received at the optical receiver with a stored downstream identification modulation sequence. The autocorrelation apparatus is further arranged to generate a downstream autocorrelation indicator and compare said indicator with a downstream threshold indicator. The autocorrelation apparatus is further arranged to, if said indicator is greater than or equal to the downstream threshold indicator, generate and transmit a first control signal comprising an indication that said received optical signal comprises a downstream optical signal.

This may enable the ONT to detect downstream optical signals of low power.

In an embodiment, each said downstream identification modulation sequence comprises a pseudo random binary sequence arranged to provide a high autocorrelation value when correlated with itself and to provide an autocorrelation value of substantially zero when correlated with a different modulation sequence. The autocorrelation apparatus may therefore be insensitive to any signal different from the identification modulation sequence, only increasing the downstream autocorrelation indicator each time an identification modulation sequence is detected.

In an embodiment, the optical network terminal further comprises a memory device arranged to store an indicator indicative that the optical network terminal has a previously set tunable optical filter transmission wavelength. The controller is arranged to interrogate the memory device to determine whether a said indicator is present in the memory device. The controller is further arranged to, if a said indicator is present, obtain said previously set wavelength and to set the transmission wavelength of the tunable optical filter to said previously set wavelength. The controller is further arranged to, if no said indicator is present, sequentially generate and transmit one or more wavelength control signals arranged to set the transmission wavelength of the tunable optical filter to a respective one or more wavelengths of the pre-selected plurality of transmission wavelengths until a said wavelength is identified for which no downstream optical signal is detected.

Providing an indication that the ONT has been previously switched on and providing the previously set wavelength may reduce the time required to configure an ONT which has been used previously, since the ONT does not need to carry out identification of an available wavelength in that case.

In an embodiment, the controller is further arranged to, if the optical network terminal is powered off, remove the memory flag from the memory device. In an embodiment, the memory device is further arranged to store a said previously set wavelength and the controller is further arranged to, if the optical network terminal is powered off, remove the previously set tunable optical filter transmission wavelength from the memory device. This may ensure that an ONT is not configured at a previously set wavelength which may not be appropriate or available for assignment at a new location.

In an embodiment, the controller is further arranged to generate and transmit an optical network terminal control signal arranged to cause the optical network terminal to commence transmission of a traffic carrying upstream optical signal at said transmission wavelength.

In an embodiment, the upstream optical signal has a first bit rate. The optical network terminal control signal is further arranged to cause the optical network terminal to commence transmission of a traffic carrying upstream optical signal at a second, higher bit rate. Reducing the bit rate of the upstream optical signal used in step b. as compared to the bit rate to be used during transmission of traffic following configuration of the ONT may correspondingly reduce the required receiver sensitivity at an OLT with which the ONT is attempting to establish communications. The ONT may therefore be based on wavelength reuse. In an embodiment, the optical transmitter comprises a tunable laser. The controller is further arranged to generate and transmit a laser wavelength control signal. The laser wavelength control signal is arranged to cause the tunable laser to operate at the transmission wavelength of the tunable optical filter. The ONT may therefore automatically adjust the operating wavelength of the tunable laser to match the transmission wavelength of the tunable filter.

A third aspect of the invention provides a passive optical network comprising an optical network terminal, an optical line terminal and an optical transmission network. The optical network terminal is according to the second aspect of the invention as described in any of the paragraphs above. The optical line terminal comprises an optical receiver, an optical transmitter and a further controller. The optical receiver is arranged to detect an upstream optical signal. The optical transmitter is arranged to generate and transmit a downstream optical signal. The further controller is arranged to determine whether an upstream optical signal from the optical network terminal has been detected. The further controller is further arranged to, if a said upstream optical signal has been detected, generate a further downstream optical signal and transmit the further downstream optical signal to the optical network terminal. The further controller is further arranged to wait for a time at least as long as a round trip time from the optical line terminal to the optical network terminal and back, and determine whether a further upstream optical signal has been received. The further controller is further arranged to, if a said further upstream optical signal is determined to have been received, generate and transmit an optical line terminal control signal. The optical line terminal control signal is arranged to cause the optical line terminal to commence transmission at the transmission wavelength of the optical network terminal. The optical transmission network connects the optical network terminal to the optical line terminal.

In an embodiment, the passive optical network forms part of a gigabit-capable passive optical network. An existing gigabit-capable passive optical network, GPON, may therefore be upgraded to partly or fully comprise a wavelength division multiplexed passive optical network, WDM-PON.

A fourth aspect of the invention provides an optical line terminal for a wavelength division multiplexed passive optical network. The optical line terminal comprises an optical receiver, an optical transmitter and a controller. The optical receiver is arranged to detect an upstream optical signal. The optical transmitter is arranged to generate and transmit a downstream optical signal. The controller is arranged to determine whether an upstream optical signal from an optical network terminal of the passive optical network has been detected. The controller is further arranged to, if a said upstream optical signal has been detected, generate a further downstream optical signal and transmit the further downstream optical signal to the optical network terminal. The controller is further arranged to wait for a time at least as long as a round trip time from the optical line terminal to the optical network terminal and back, and determine whether a further upstream optical signal has been received. The controller is further arranged to, if a said further upstream optical signal is determined to have been received, generate and transmit an optical line terminal control signal. The optical line terminal control signal is arranged to cause the optical line terminal to commence transmission at the transmission wavelength of the optical network terminal.

Embodiments of the invention will now be described, by way of example only, with reference to the accompanying drawings.

DETAILED DESCRIPTION

Figure 1:
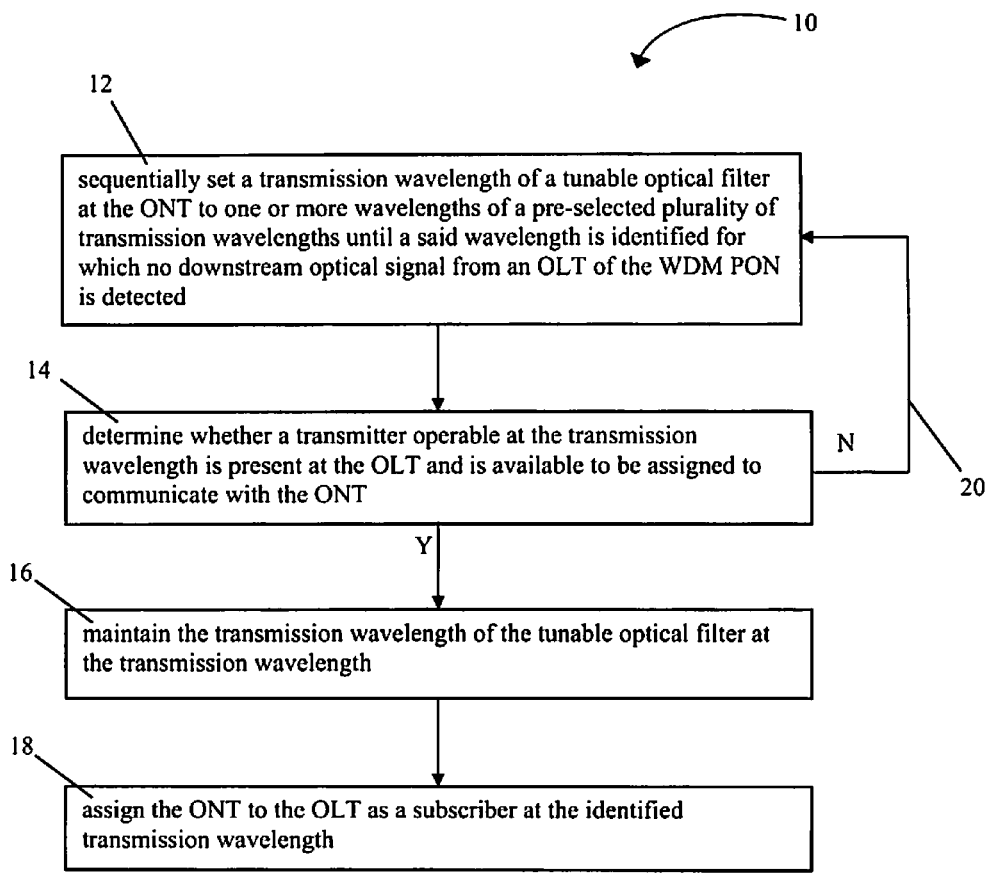
FIG. 1 shows the steps of a method according to a first embodiment of the invention of configuring an optical network terminal (ONT) of a wavelength division multiplexed (WDM) passive optical network (PON)

The steps of a method 10 of configuring an optical network terminal, ONT, of a wavelength division multiplexed passive optical network, WDM PON, according to first embodiment of the invention are shown in FIG. 1. The method comprises:

a. sequentially setting a transmission wavelength of a tunable optical filter at the ONT to one or more wavelengths of a pre-selected plurality of transmission wavelengths until a wavelength is identified for which no downstream optical signal from an optical line terminal, OLT, of the WDM PON is detected 12;

b. determining whether a transceiver transmitter operable at the identified transmission wavelength is present at the OLT and is available to be assigned to communicate with the ONT 14;

c. if a said transmitter is determined to be present and available, maintaining the transmission wavelength of the tunable optical filter at said transmission wavelength (16) and assigning the ONT to the OLT as a subscriber at the identified transmission wavelength 18; and d. if a said transmitter is determined to be one of not present and not available, recommencing the method at step a. for one or more further wavelengths of said pre-selected plurality of wavelengths 20.

In a second embodiment of the invention, described in relation to FIG. 1, step a. comprises sequentially setting the transmission wavelength of the tunable optical filter at the ONT to one or more wavelengths of the pre-selected plurality of transmission wavelengths until the transmission wavelength is set to a wavelength for which a first loss of signal, LOS, alarm having a high alarm condition is received. As will be well known to the person skilled in the art, a LOS alarm having a high alarm condition indicates that no optical signal has been detected and a LOS alarm having a low alarm condition indicates that an optical signal has been detected.

Figure 2:
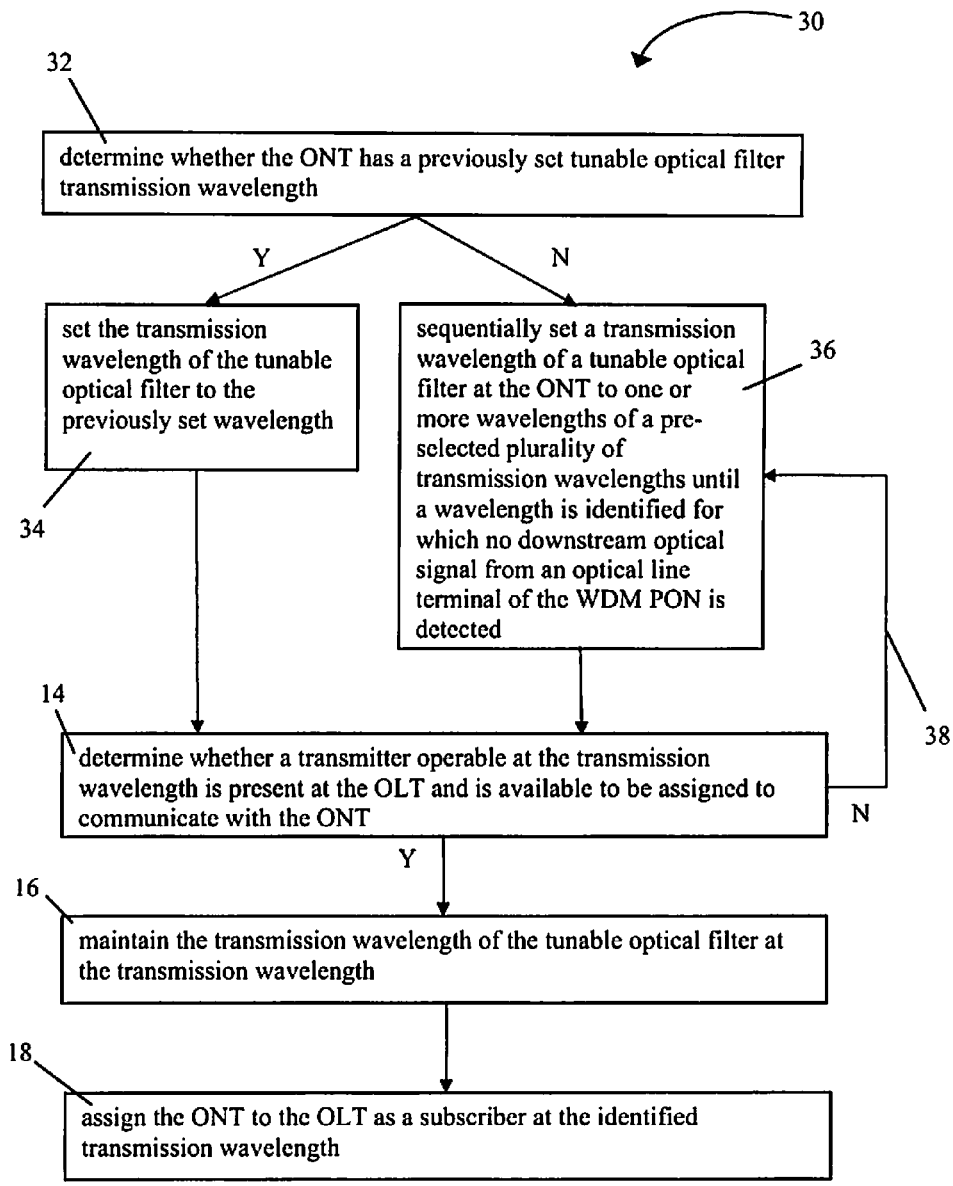
FIG. 2 shows the steps of a method according to a third embodiment of the invention of configuring an ONT of a WDM PON.

Referring to FIG. 2, a third embodiment of the invention provides a method 30 of configuring an ONT of a WDM PON which is similar to the method 10 of FIG. 1, with the following modifications. The same reference numbers are retained for corresponding steps.

In this embodiment, step a. comprises:

i. determining whether the ONT has a previously set tunable optical filter transmission wavelength 32;

ii. if there is a previously set wavelength, setting the transmission wavelength of the tunable optical filter to said previously set wavelength 34; and otherwise iii. sequentially setting a transmission wavelength of a tunable optical filter at the ONT to one or more wavelengths of a pre-selected plurality of transmission wavelengths until a wavelength is identified for which no downstream optical signal from the OLT is detected 36.

Step d. comprises, if a transmitter is determined to be one of not present and not available, recommencing the method at step iii. for one or more further wavelengths of the pre-selected plurality of wavelengths 38.

In a fourth embodiment of the invention, described in relation to FIG. 2, step a. comprises sequentially setting the transmission wavelength of the tunable optical filter at the ONT to one or more wavelengths of the pre-selected plurality of transmission wavelengths until the transmission wavelength is set to a wavelength for which a first loss of signal, LOS, alarm having a high alarm condition is received.

Figure 3:
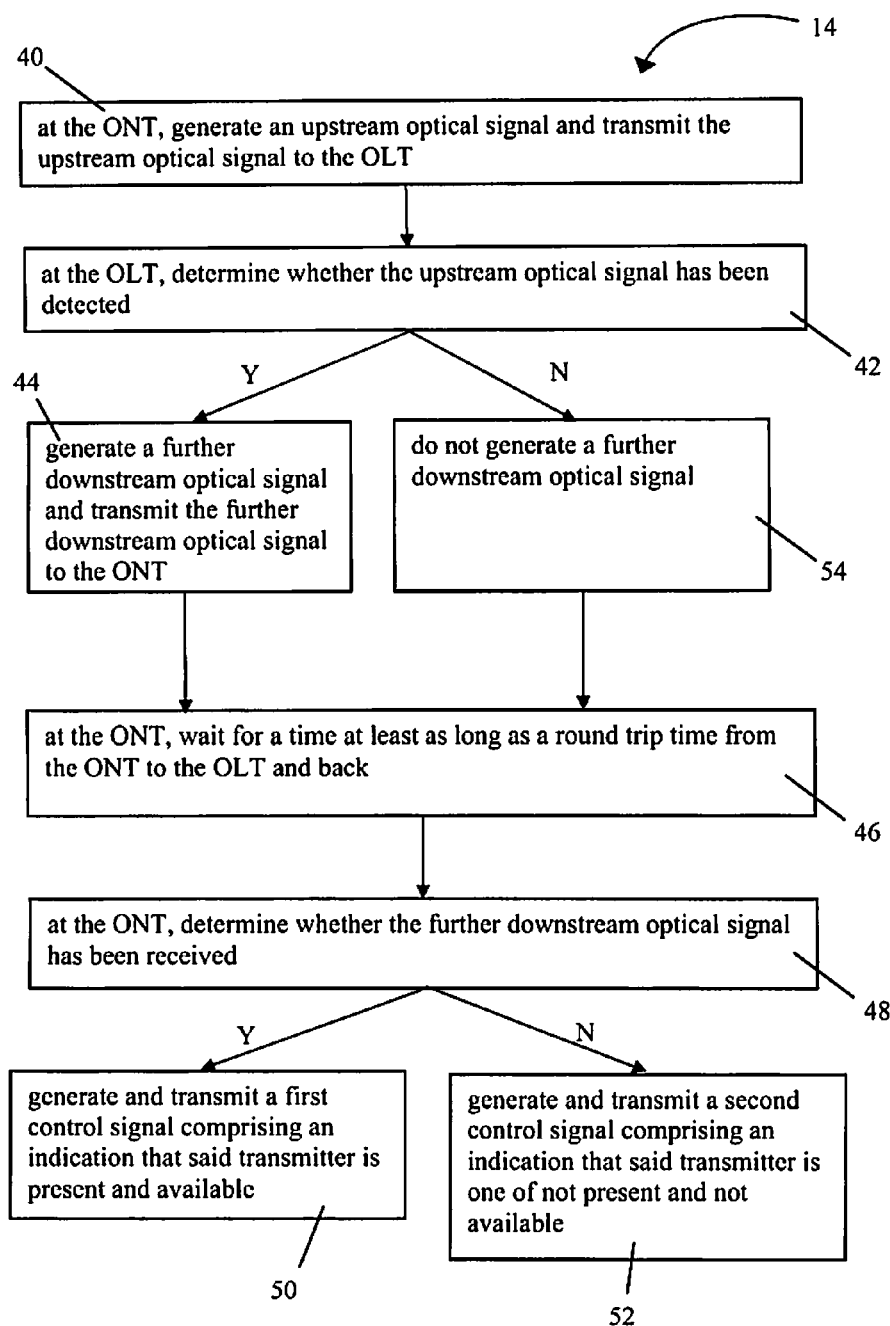
FIG. 3 shows the steps of step b. of FIG. 1 of a method according to a fifth embodiment of the invention.

A fifth embodiment of the invention provides a method of configuring an ONT of a WDM PON which is similar to the method 10 of FIG. 1. In this embodiment step b. 14 comprises the steps shown in FIG. 3.

In this embodiment, step b. 14 comprises:

A. at the ONT, generating an upstream optical signal and transmitting the upstream optical signal to the OLT 40;

B. at the OLT, determining whether a said upstream optical signal has been detected 42, and if a said upstream optical signal has been detected generating a further downstream optical signal and transmitting the further downstream optical signal to the ONT 44;

C. at the ONT, waiting for a time at least as long as a round trip time from the ONT to the OLT and back 46, and determining whether a said further downstream optical signal has been received 48; and D. if a said further downstream optical signal is determined to have been received, generating and transmitting a first control signal comprising an indication that said transmitter is present and available 50;

E. if no said further downstream optical signal is determined to have been received, generating and transmitting a second control signal comprising an indication that said transmitter is one of not present and not available 52.

A sixth embodiment of the invention provides a method of configuring an ONT of a WDM PON which is similar to the method of the previous embodiment, with the following modifications.

In this embodiment, in step B. 42 an upstream optical signal is determined as having been detected if a second LOS alarm having a low alarm condition is received at the OLT. In step C. a further downstream optical signal is determined as having been received if a third LOS alarm having a low alarm condition is received at the ONT.

A seventh embodiment of the invention provides a method of configuring an ONT of a WDM PON which is similar to the method of the fifth embodiment, with the following modifications.

Figure 4:
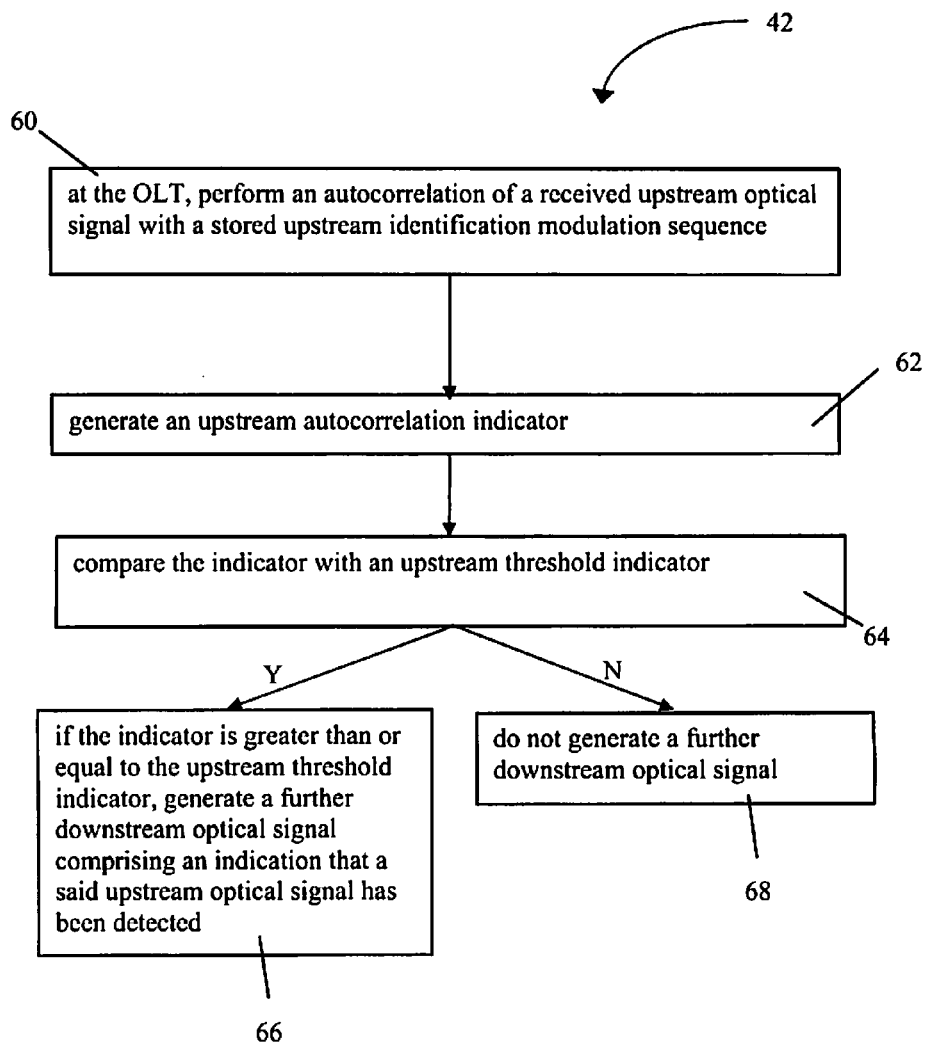
FIG. 4 shows the steps of step B. of FIG. 3 of a method according to a seventh embodiment of the invention.

In this embodiment, the upstream optical signal comprises an upstream identification modulation sequence, which in this example comprises a pseudo random binary sequence, PRBS. The steps of step B. 42 of this embodiment are shown in FIG. 4.

In step B. 42 of this embodiment the upstream optical signal is detected by:

at the OLT, performing an autocorrelation of a received upstream optical signal with a stored upstream identification modulation sequence 60;

generating an upstream autocorrelation indicator 62 and comparing the indicator with an upstream threshold indicator 62; and if the indicator is greater than or equal to the upstream threshold indicator generating a further downstream optical signal comprising an indication that an upstream optical signal has been detected 66.

If the indicator is less than the upstream threshold indicator, no further downstream optical signal is generated 68.

An eighth embodiment of the invention provides a method of configuring an ONT of a WDM PON which is similar to any of the methods of the previous embodiments, with the following modification.

Figure 5:
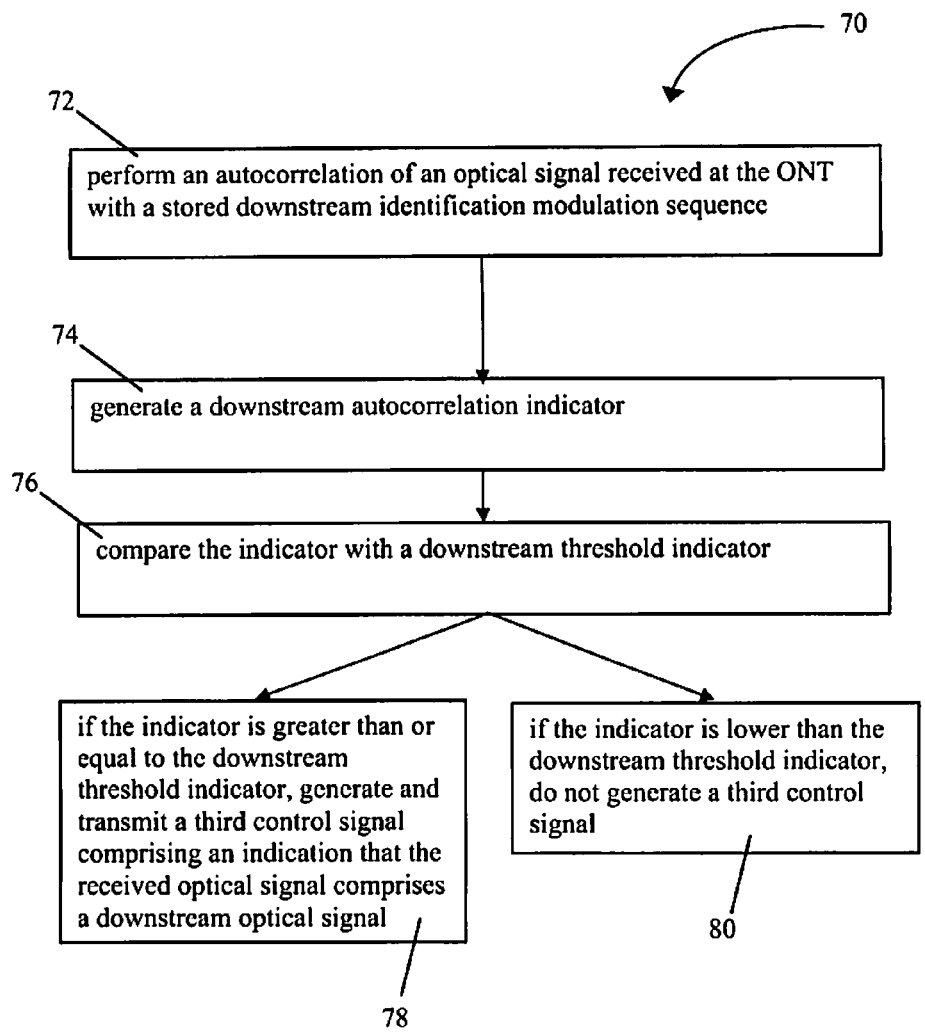
FIG. 5 shows further steps of step a. of FIG. 1 of a method according to an eighth embodiment of the invention.

In this embodiment, each downstream optical signal comprises a downstream identification modulation sequence, which in this example comprises a further PRBS. Referring to FIG. 5, each of step a., step iii. and step C. respectively further comprise 70, if a LOS alarm having a high alarm condition is received:

performing an autocorrelation of an optical signal received at the ONT with a stored downstream identification modulation sequence 72;

generating a downstream autocorrelation indicator 74 and comparing the indicator with a downstream threshold indicator 76; and if the indicator is greater than or equal to the downstream threshold indicator, generating and transmitting a third control signal comprising an indication that the received optical signal comprises a downstream optical signal 78.

If the indicator is less than the downstream threshold indicator no third control signal is generated 80.

Figure 6:
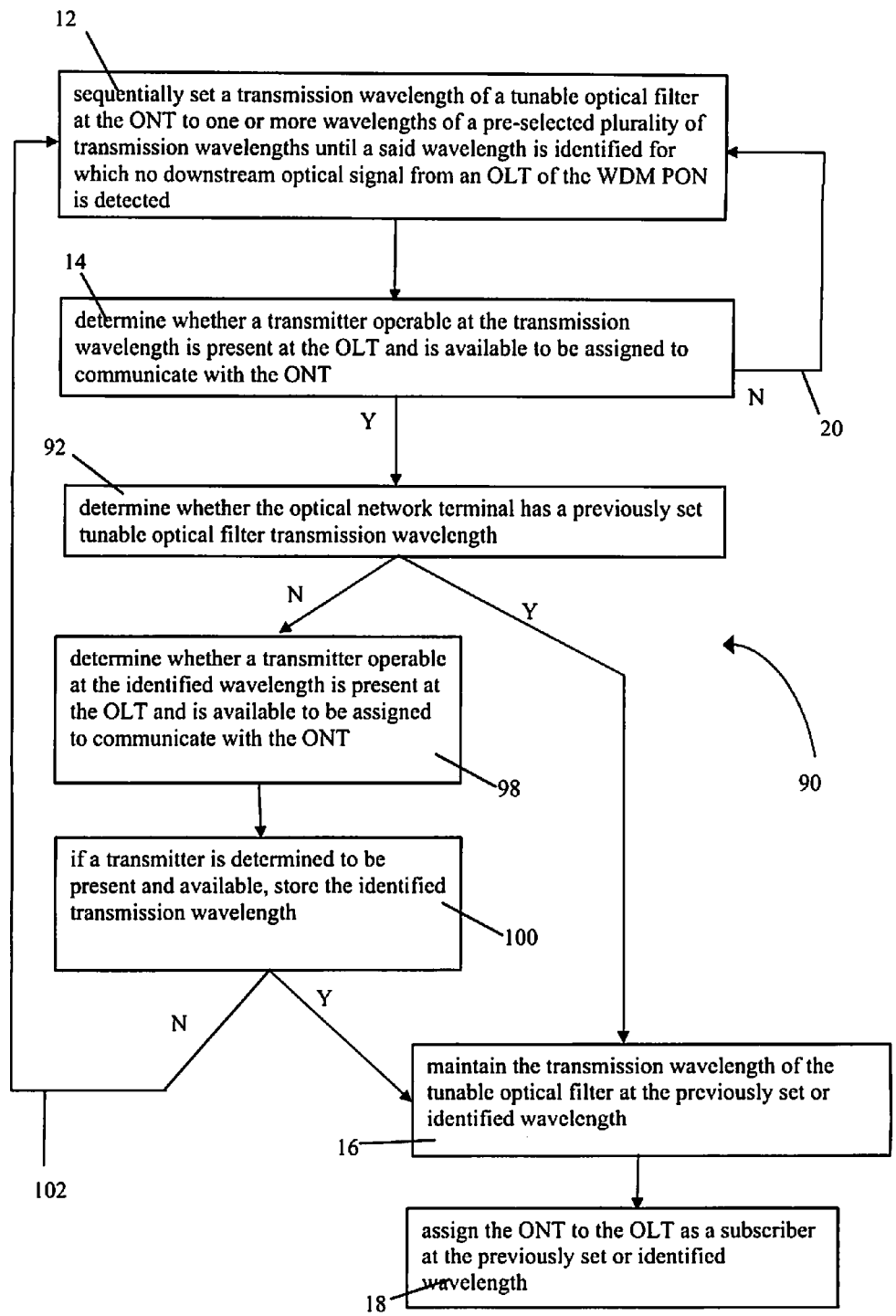
FIG. 6 shows the steps of a method according to a ninth embodiment of the invention of configuring an ONT of a WDM PON.

A ninth embodiment of the invention provides a method 90 of configuring an ONT of a WDM PON having the steps shown in FIG. 6. The method 90 of this embodiment is similar to the method 10 shown in FIG. 1, with the following modifications. The same reference numbers are retained for corresponding steps.

In this embodiment, step c. comprises determining whether the optical network terminal has a previously set tunable optical filter transmission wavelength 92. If there is a previously set wavelength, the transmission wavelength of the tunable optical filter is maintained at the previously set wavelength 16 at the ONT, and at the OLT the optical network terminal is assigned to the optical line terminal as a subscriber at said previously set wavelength 18.

If there is not a previously set wavelength, step c. further comprises determining whether a transmitter operable at the identified wavelength is present at the OLT and is available to be assigned to communicate with the ONT 98. If a transmitter is determined to be present and available, the identified transmission wavelength is stored 100. The transmission wavelength of the tunable optical filter is also maintained at the identified transmission wavelength 16 and at the OLT the ONT is assigned to the OLT as a subscriber at the identified transmission wavelength 18. If a transmitter is determined to be either not present or not available for communication with the ONT, the method recommences at step a. 102 for one or more further wavelengths of the pre-selected plurality of wavelengths.

Figure 7:
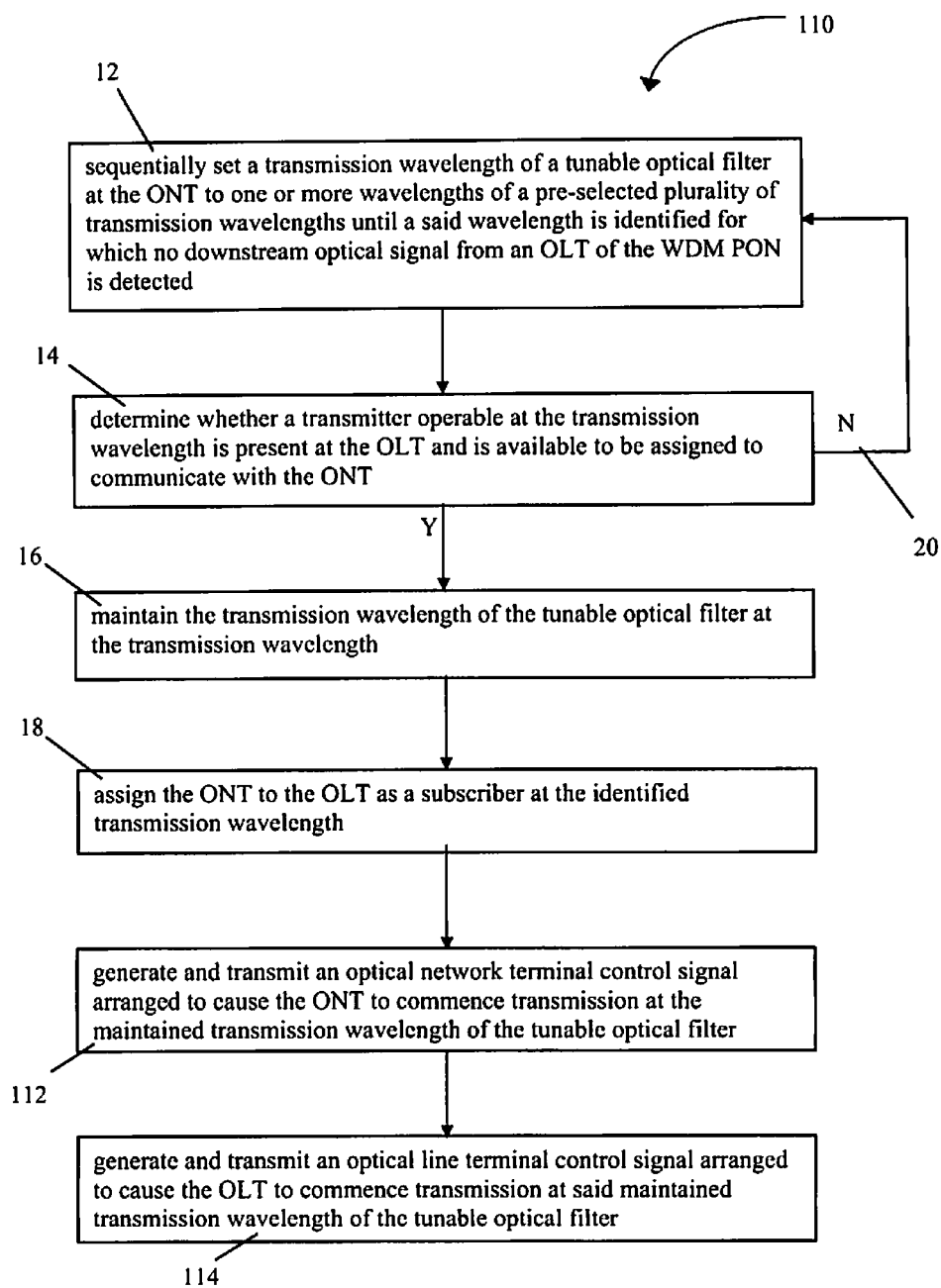
FIG. 7 shows the steps of a method according to a tenth embodiment of the invention of configuring an ONT of a WDM PON.

A tenth embodiment of the invention provides a method 110 of configuring an ONT of a WDM PON having the steps shown in FIG. 7. The method 110 of this embodiment is similar to the method 10 shown in FIG. 1, with the following modifications. The same reference numbers are retained for corresponding steps.

In this embodiment, step c. further comprises generating and transmitting an ONT control signal arranged to cause the ONT to commence transmission of a traffic carrying upstream optical signal at the maintained transmission wavelength of the tunable optical filter 112. An OLT control signal arranged to cause the OLT to commence transmission of a traffic carrying downstream optical signal at the maintained transmission wavelength of the tunable optical filter is also generated and transmitted 114.

An eleventh embodiment of the invention provides a method of configuring an ONT of a WDM PON which is similar to the methods of the fifth and sixth embodiments, with the following modifications.

In this embodiment, the upstream optical signals used in step b. have a first bit rate. The ONT control signal is further arranged to cause the ONT to commence transmission of a traffic carrying upstream optical signal at the maintained transmission wavelength of the tunable optical filter at a second, higher bit rate.

Figure 8:
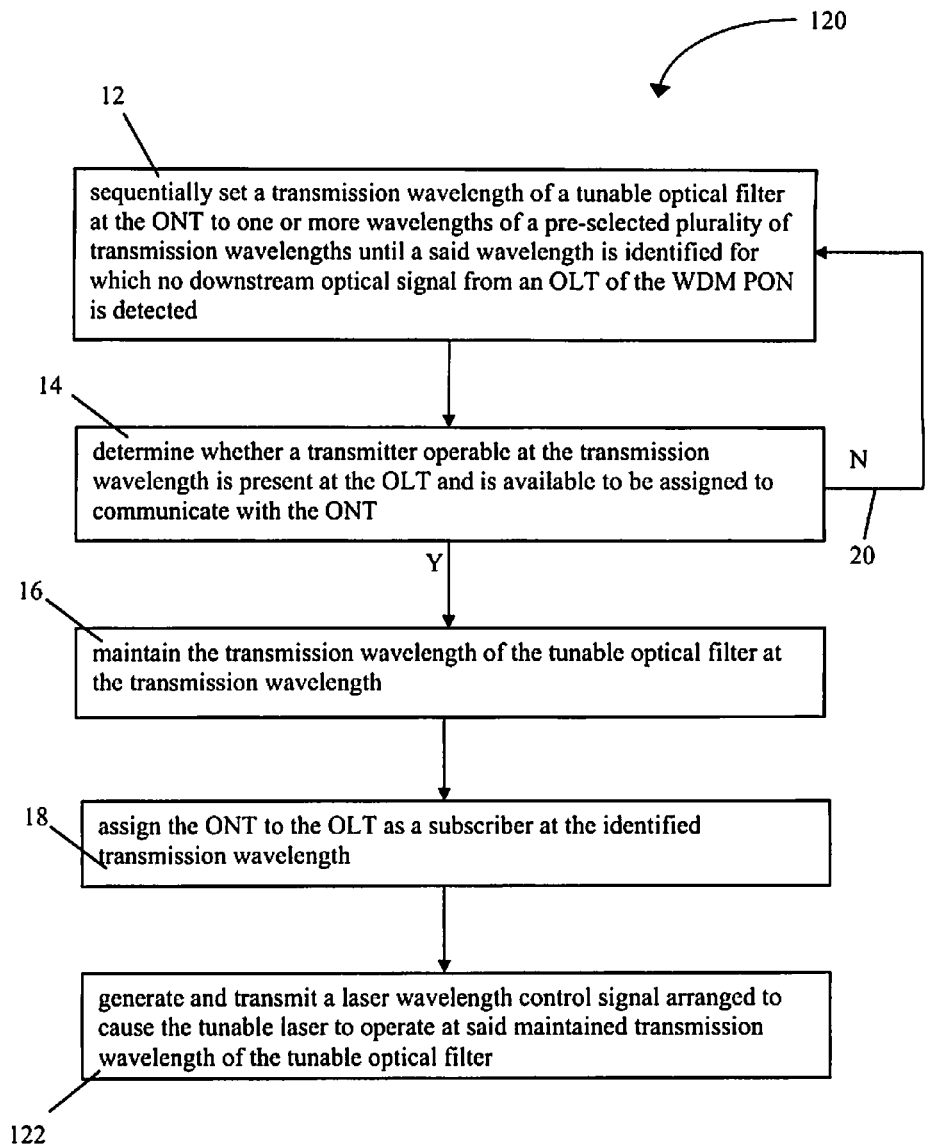
FIG. 8 shows the steps of a method according to a twelfth embodiment of the invention of configuring an ONT of a WDM PON.

A twelfth embodiment of the invention provides a method 120 of configuring an ONT of a WDM PON having the steps shown in FIG. 8. The method 120 of this embodiment is similar to the method 10 shown in FIG. 1, with the following modifications. The same reference numbers are retained for corresponding steps.

In this embodiment, the ONT comprises an optical transmitter comprising a tunable laser. Step c. further comprises generating and transmitting a laser wavelength control signal arranged to cause the tunable laser to operate at the maintained transmission wavelength of the tunable optical filter 122.

Figure 9:
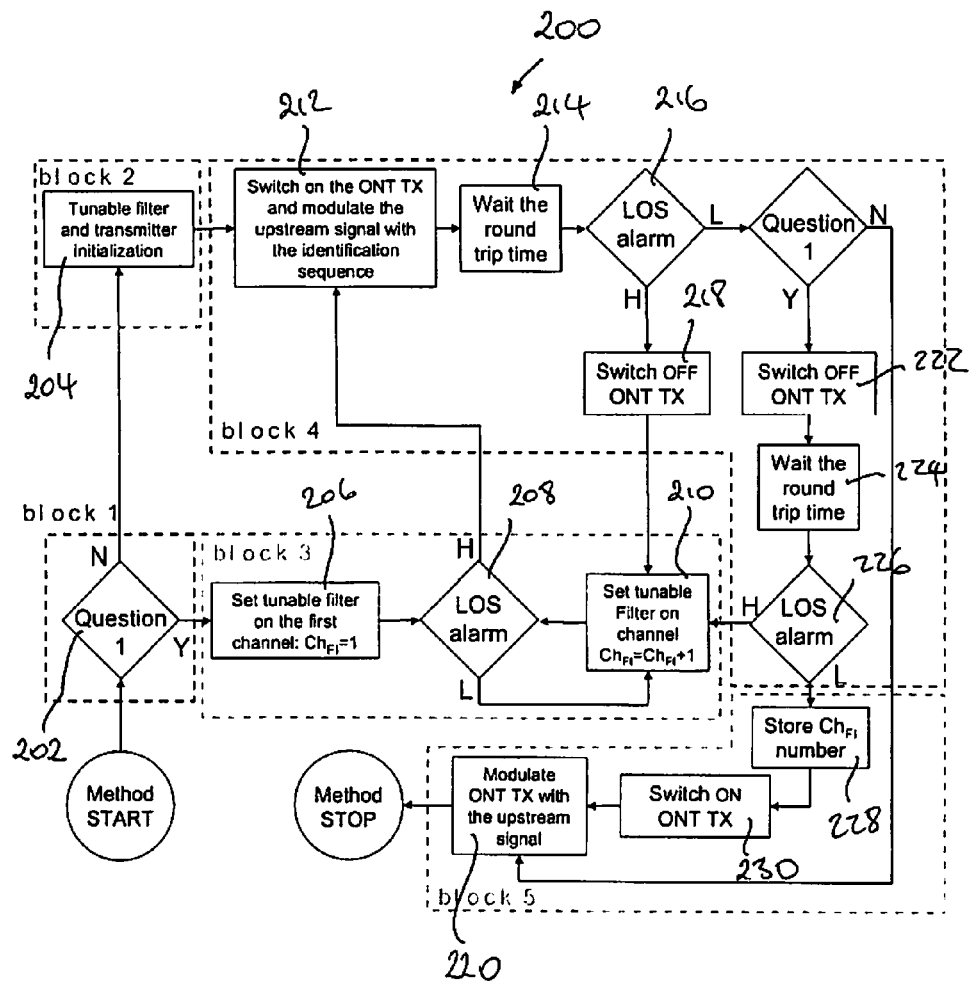
FIG. 9 is a flow chart of the steps at the ONT of a method according to a thirteenth embodiment of the invention of configuring an ONT of a WDM PON.
Figure 10:
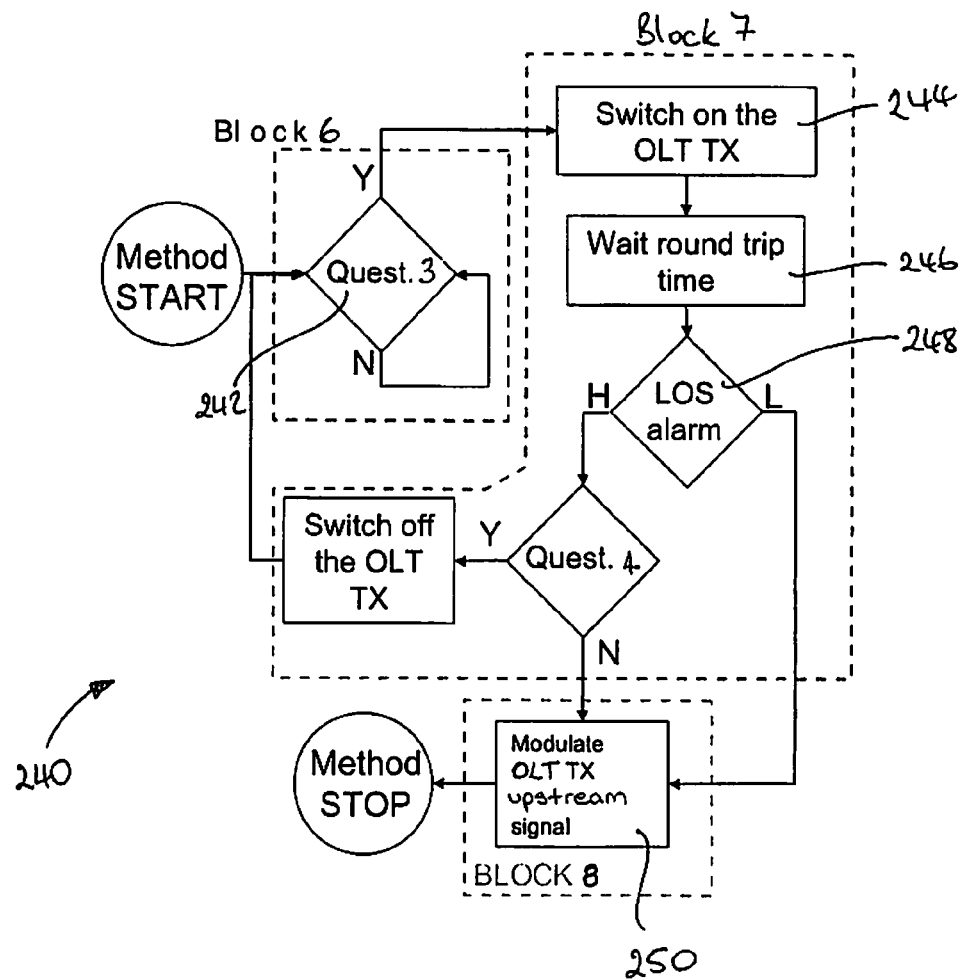
FIG. 10 is a flow chart of the steps at the OLT of the method according to the thirteenth embodiment of the invention of configuring an ONT of a WDM PON.

A thirteenth embodiment of the invention provides a method of configuring an ONT of a WDM PON having the steps shown in FIGS. 9 and 10.

The method of this embodiment comprises steps 200 shown in FIG. 9 carried out at the ONT and steps shown in FIG. 10 carried out at the ONT.

The steps of the method 200 carried out at the ONT may be categorised into five operational blocks.

In block 1 a check is made as to whether it is the first time the ONT has been switched on at this location. This is done by asking Question 1: Is it the first time the ONT has been switched on? Y/N 202. This is answered by inspecting a memory device of the ONT to determine whether a memory flag is present indicating that the ONT has been previously switched on.

If the answer to Question 1 in block 1 is No, indicating that the ONT has been switched on before, block 2 is called which implements ONT initialization using a stored previously used wavelength. The previously used wavelength is retrieved from a memory device of the ONT.

If the answer to Question 1 in block 1 is Yes, indicating first switch on of the ONT at that location, block 3 is called which implements downstream spectrum scanning. At the first switch on of the ONT, the tunable filter scans all the possible channel wavelengths which may be used in the WDM PON until it finds a free one (that is until it detects no optical power).

The tunable filter wavelength is set to a first wavelength of the WDM PON channel spectrum 206 and the value of a LOS alarm at an ONT receiver is checked 208. If the value is low (a downstream signal is present), the next wavelength is selected 210 and the LOS value is checked again, and so on until a channel wavelength is identified for which the LOS alarm value is high, indicating that no downstream signal is present. Once a free wavelength is identified block 4 is called.

Block 4 implements a handshake session between the ONT and the OLT in order to verify that the OLT transceiver is present and available to be assigned to the ONT. The handshake session is different depending on whether or not it is the first time that the ONT has been switched on.

In Block 4 the ONT transmitter is switched on and an upstream signal is generated and modulated with an upstream identification sequence 212. Once the OLT recognizes the identification sequence, it switches on its transmitter, as will be described in more detail below. The ONT waits for a time equal or longer then the round trip time from the ONT to the OLT and back 214. A new check is made on the LOS alarm 216 in order to verify whether the OLT transmitter is present on the identified wavelength. If the LOS alarm remains high (no transmitter is present at the OLT), the ONT transmitter is switched off 218, and block 3 is called again, setting the tunable filter transmission wavelength to the next channel wavelength in the spectrum 210.

If the LOS alarm is low (OLT transmitter present and correctly switched on) and it is not the first time that the ONT has been switched on, the ONT is assigned to the OLT as a subscriber at the identified wavelength and block 5 is called.

Once an available wavelength channel has been correctly identified for the ONT, the optical link is set up between the ONT and the OLT and both downstream and upstream signals can pass through the network. Block 5 therefore causes the ONT transmitter to start to modulate the upstream signal with traffic to be transmitted to the OLT 220.

At the first switch on event, the method additionally verifies whether the OLT transmitter is really available to be associated to the ONT or whether it is merely temporarily free because its assigned ONT is silent. To do so, the ONT transmitter is switched off 222, the ONT waits for a second round trip time 224 and then checks the LOS alarm again 226.

If the LOS alarm is high, the wavelength channel has already been assigned to another ONT and block 3 is called again, setting the tunable filter transmission wavelength to the next channel wavelength in the spectrum 210. If the LOS alarm is low, the identified wavelength relates to a wavelength channel which is available and block 5 is called, to commence upstream transmission of traffic. The identified wavelength is stored 228 and the ONT transmitter is switched on 230. The ONT transmitter then starts to modulate the upstream signal with traffic to be transmitted to the OLT 220.

The steps of the method 240 carried out at the OLT may be categorised into three further operational blocks.

Block 6 comprises a listening session, during which the OLT receiver waits until it detects a signal from the ONT 242. This is effectively asking Question 3: is an ONT presence detected?

Block 7 comprises a further handshake session. When the OLT detects the presence of an ONT, the handshake session starts in order to verify whether or not an optical link can be set up between the ONT and the OLT. Block 7 comprises switching the OLT transmitter on when an ONT is detected 244. The OLT waits for the round trip time 246 and then checks its LOS alarm 248. If the LOS alarm is low (the assigned ONT is working), block 8 is called.

Block 8 initiates regular downstream transmission and the ONT transmitter modulates the downstream signal with traffic to be transmitted to the ONT.

If the LOS alarm is high (the assigned ONT is not working) it is the first time the detected ONT has been switched on and the OLT verifies whether it has already been assigned to another ONT. This is done by asking Question 4: Is the OLT transmitter already assigned to an ONT? This may for example be done by reading flag in a memory device of the ONT. If the OLT has already been assigned to another ONT, the OLT switches off its transmitter and calls block 6. If the OLT transmitter has not already been assigned to an ONT the OLT calls block 8.

The ONT therefore triggers operation of the OLT, which has the great advantage that the OLT transmitter is does not operate when there is no assigned ONT on a particular wavelength channel or if the assigned ONT is silent. However, this can present a problem when the ONT is based on a wavelength reuse technique, such as where the ONT is based on a reflective semiconductor amplifier, RSOA, where a downstream signal sent by the OLT is remodulated at the RSOA to generate an upstream signal. In the absence of a downstream signal from the OLT, the ONT can intensity modulate a spectral slice of amplification noise emitted by the RSOA and filtered by the tunable filter. The resulting upstream signal is attenuated during upstream transmission by the WMD PON distribution node and by optical fibre losses, so that the typical power received by the upstream receiver at the OLT may be far below the receiver sensitivity and the OLT LOS alarm threshold.

In this embodiment this problem may be mitigated in two ways. Firstly, the signal bit rate used for the upstream and downstream signals in blocks 4 and 7 may be set to be a fraction of the bit rate to be used during transmission of traffic in blocks 5 and 8. This will correspondingly decrease the receiver sensitivity at both the ONT and the OLT.

Secondly, the downstream signal used in block 7 is modulated with a downstream identification sequence and both the upstream and downstream identification sequences comprise a periodic sequence, such as a PRBS, with good autocorrelation features. The upstream and downstream signals used in blocks 4 and 7 are passed to a correlator after the respective receiver and correlated with respective stored copies of themselves. The average value of the correlator output is insensitive to any signal which is different from the respective identification sequence while it increases every time an identification sequence is detected. When the correlator output for an upstream signal is higher than a fixed threshold, the OLT is able to recognize the ONT presence. Similarly, when the correlator output for a downstream signal is higher than a fixed threshold, the ONT is able to recognize the OLT presence.

Figure 11:
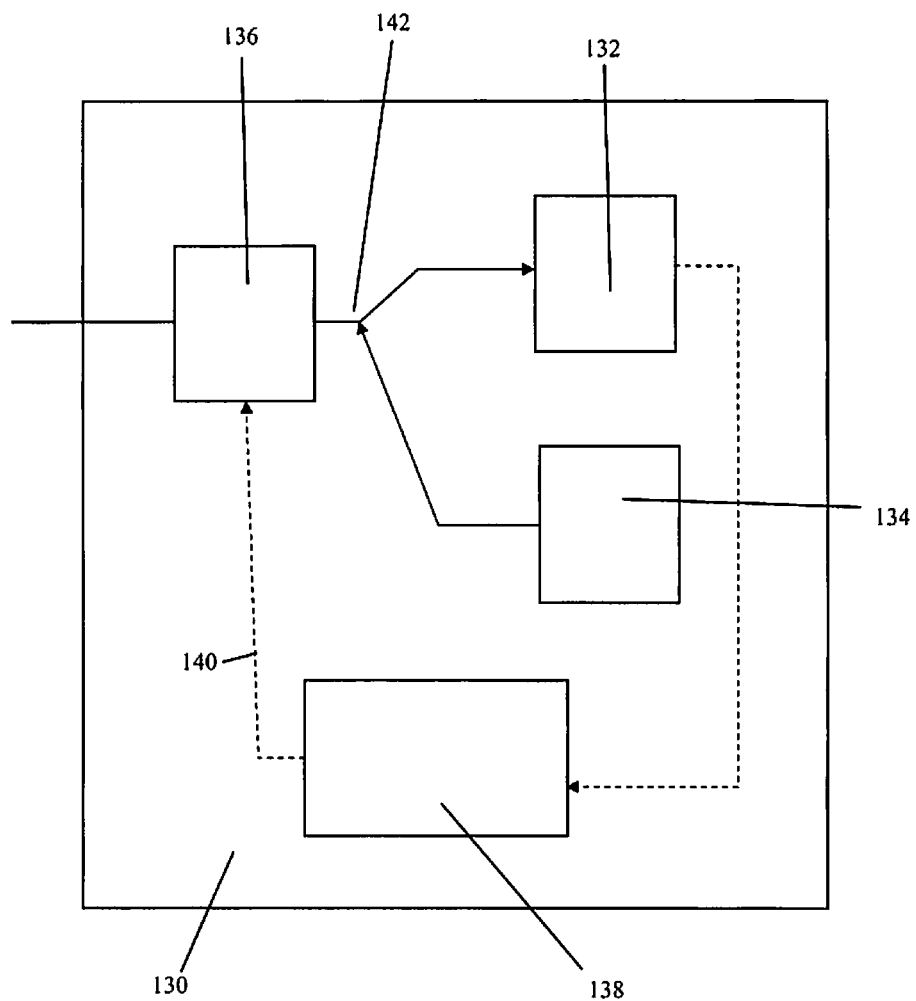
FIG. 11 is a diagrammatic representation of an ONT for a WDM PON according to a fourteenth embodiment of the invention.

A fourteenth embodiment of the invention provides an ONT 130 for a WDM PON, as shown in FIG. 11. The ONT 130 comprises an optical receiver 132, an optical transmitter 134, a tunable optical filter 136 and a controller 138.

The optical receiver 132 is arranged to detect a downstream optical signal. The optical transmitter 134 is arranged to generate and transmit an upstream optical signal. The tunable optical filter 136 has a tunable transmission wavelength and is arranged to receive and to transmit to the optical receiver any received downstream optical signal at a selected said transmission wavelength.

In this embodiment, the optical transmitter 134 is based on wavelength re-use and comprises an RSOA. The tunable filter 136 is therefore provided before both the optical receiver 132 and the optical transmitter 134, and an optical splitter 142 is provided to split a received downstream optical signal for delivery to both the receiver 132 and the transmitter 134.

The controller 138 is arranged to:

a. sequentially generate and transmit one or more wavelength control signals 140 arranged to set the transmission wavelength of the tunable optical filter to a respective one or more wavelengths of a pre-selected plurality of transmission wavelengths until a wavelength is identified for which no downstream optical signal is detected;

b. determine whether a transmitter operable at the identified transmission wavelength is present at an OLT of the WDM PON and is available to be assigned to communicate with the ONT 130;

c. if a transmitter is determined to be present and available, maintain the transmission wavelength of the tunable optical filter 136 at the identified transmission wavelength; and d. if a transmitter is determined to be one of not present and not available, recommence step a. for one or more further wavelengths of the pre-selected plurality of wavelengths.

Figure 12:
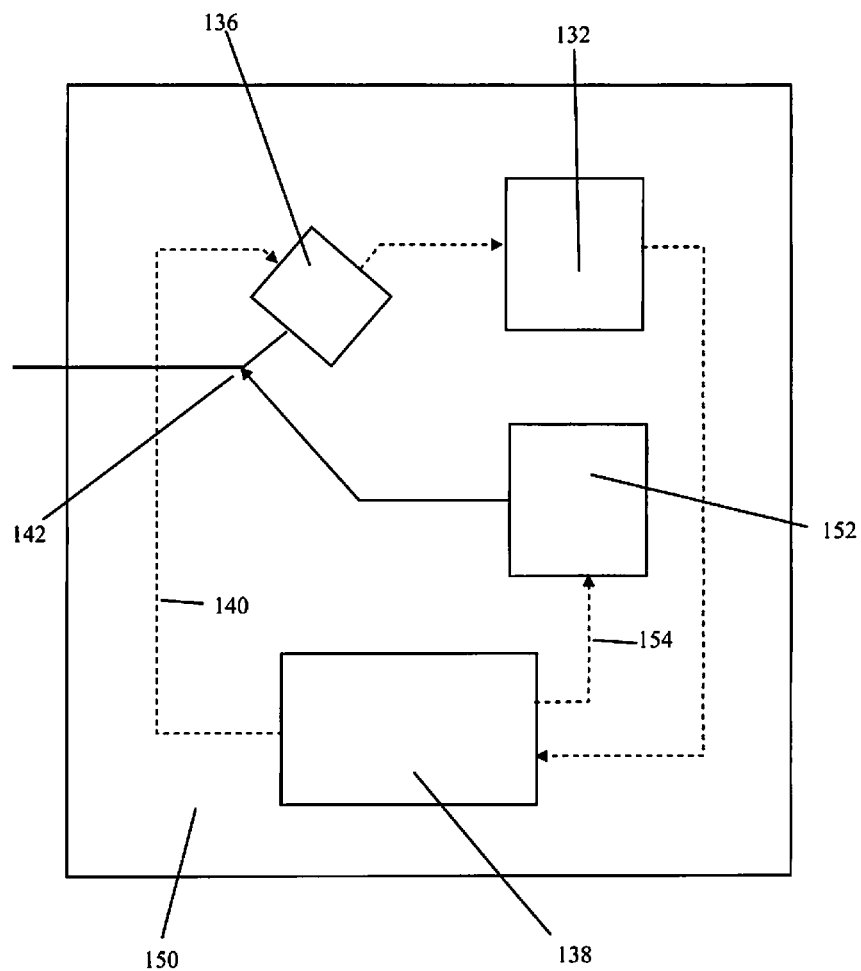
FIG. 12 is a diagrammatic representation of an ONT for a WDM PON according to a fifteenth embodiment of the invention.

A fifteenth embodiment of the invention provides an ONT 150 for a WDM PON, as shown in FIG. 12. The ONT 150 of this embodiment is similar to the ONT 130 of FIG. 11, with the following modifications.

In this embodiment, the optical transmitter 152 comprises a tunable laser. The tunable optical filter 136 is therefore provided after the optical splitter 142 so that upstream optical signals do not encounter the tunable optical filter 136.

The controller 138 is further arranged to generate and transmit a laser wavelength control signal 154 arranged to cause the tunable laser 152 to operate at the transmission wavelength of the tunable optical filter 136.

Figure 13:
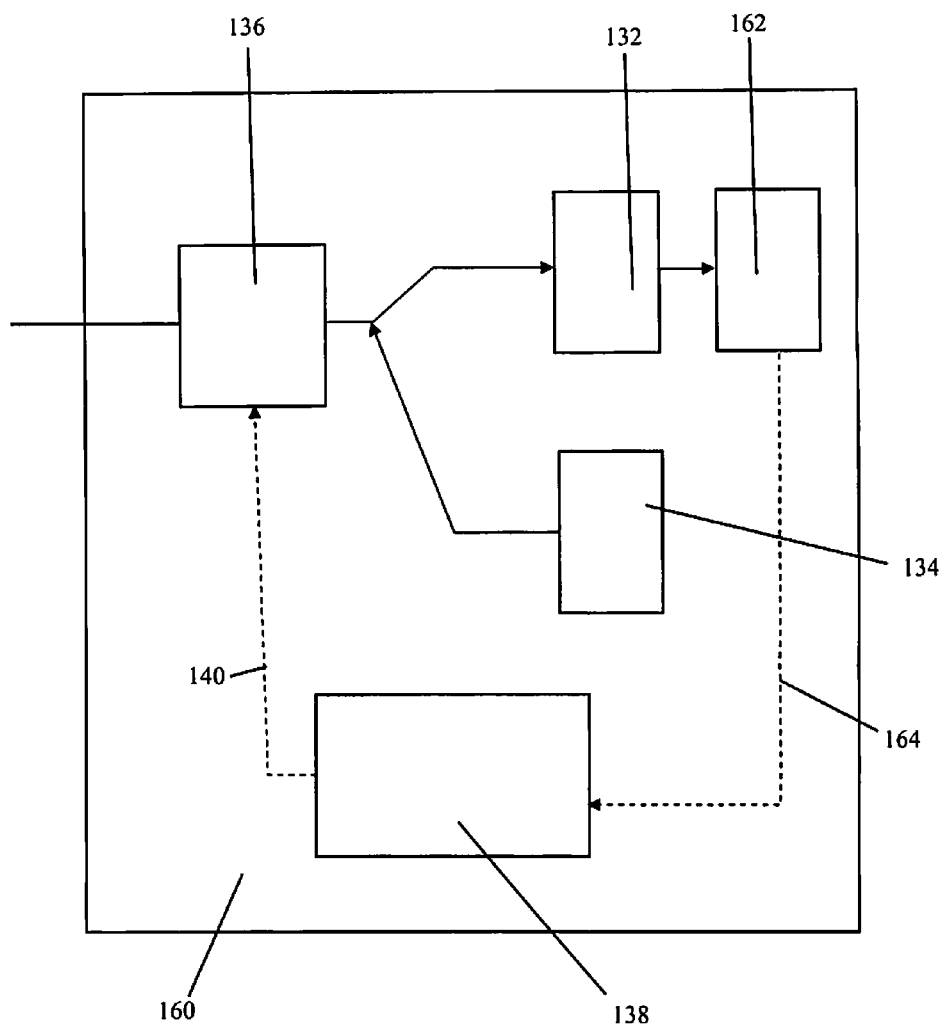
FIG. 13 is a diagrammatic representation of an ONT for a WDM PON according to a sixteenth embodiment of the invention.
Figure 14:
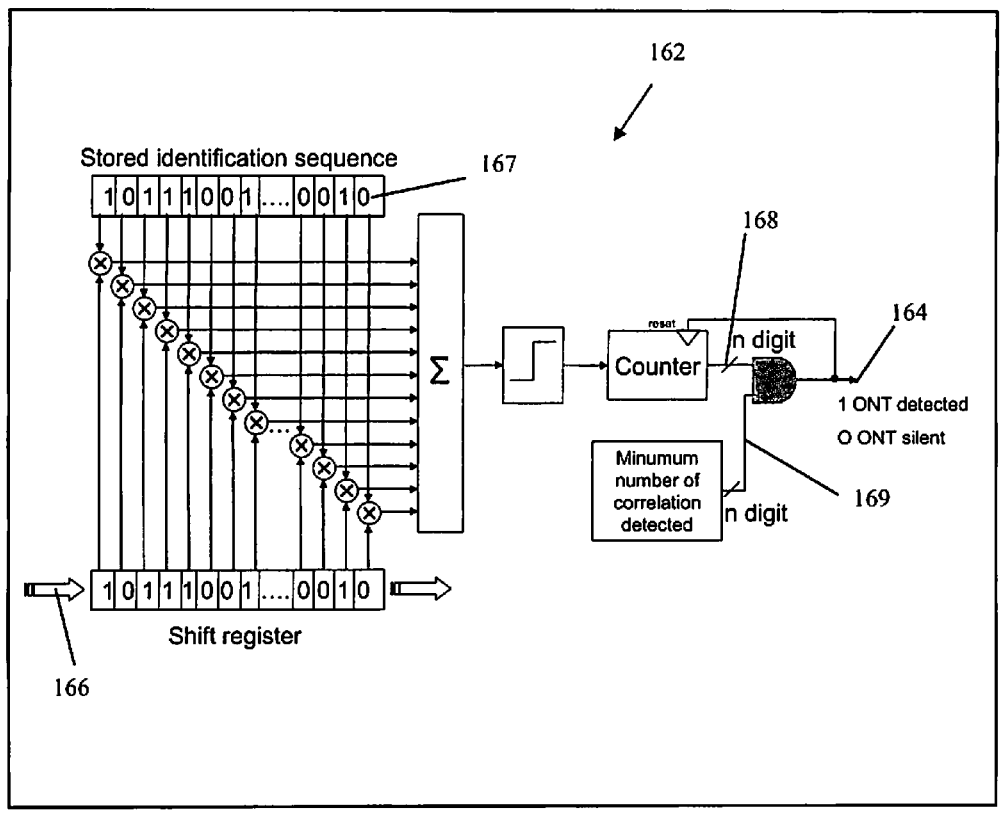
FIG. 14 is a diagrammatic representation of the auto correlation apparatus of the ONT of FIG. 13.

Referring to FIGS. 13 and 14, a sixteenth embodiment of the invention provides an ONT 160 for a WDM PON which is similar to the ONT 130 of FIG. 11, with the following modifications.

In this embodiment, the downstream optical signal comprises a downstream identification modulation sequence, such as a PRBS. The ONT 160 further comprises autocorrelation apparatus 162 provided after the optical receiver. The autocorrelation apparatus 162 is arranged to:

perform an autocorrelation of an optical signal 166 received at the optical receiver 132 with a stored downstream identification modulation sequence 167;

generate a downstream autocorrelation indicator 168 and compare the indicator with a downstream threshold indicator 169; and if the indicator is greater than or equal to the downstream threshold indicator, generate and transmit a first control signal 164 comprising an indication that the received optical signal comprises a downstream optical signal.

If the indicator is less than the downstream threshold indicator, no control signal is generated.

Figure 15:
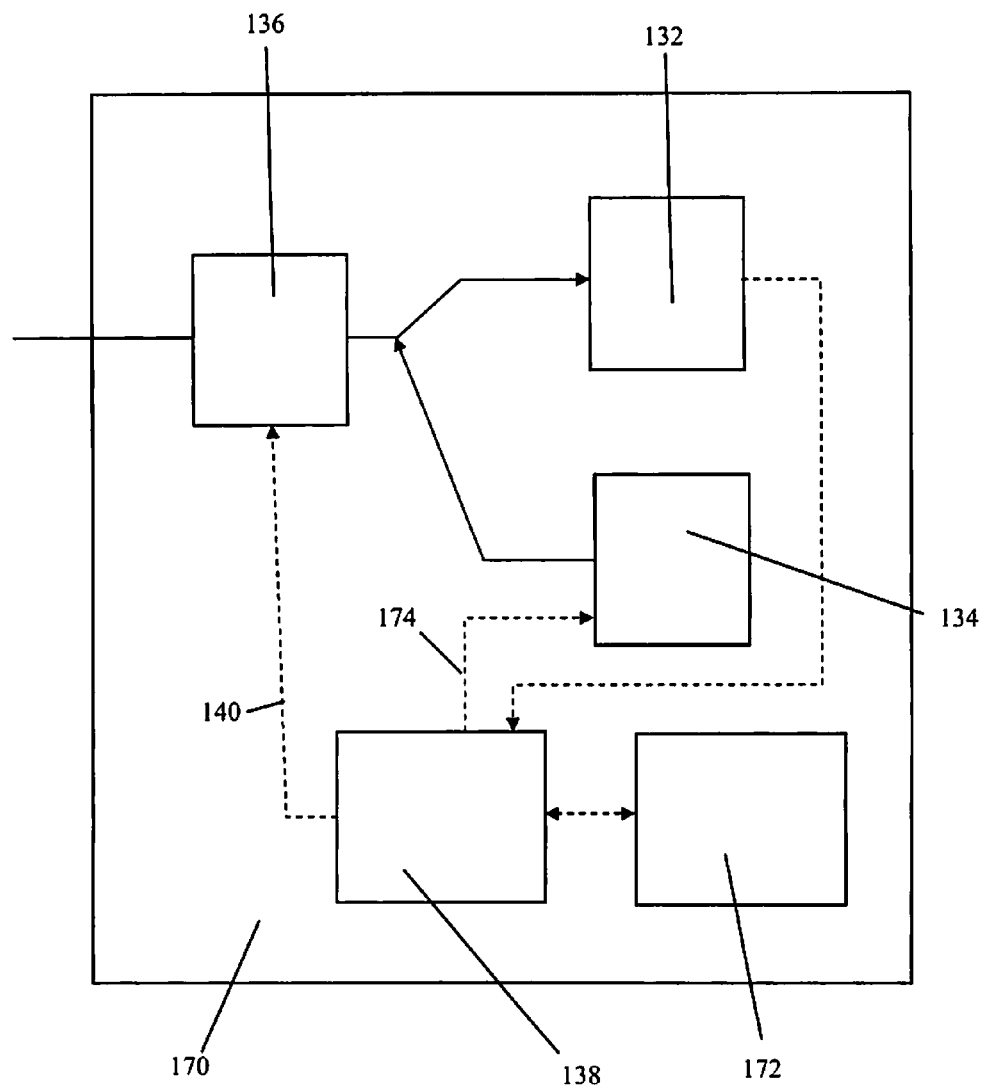
FIG. 15 is a diagrammatic representation of an ONT for a WDM PON according to a seventeenth embodiment of the invention.

A seventeenth embodiment of the invention provides an ONT 170 for a WDM PON, as shown in FIG. 15. The ONT 170 of this embodiment is similar to the ONT 130 of FIG. 11, with the following modifications.

In this embodiment, the ONT 170 further comprises a memory device 172. The memory device 172 is arranged to store an indicator indicative that the ONT has a previously set tunable optical filter transmission wavelength. In this example, a memory flag is stored in the memory device 172 to indicate that the ONT 170 has been previously switch on and the previously set wavelength is stored in the memory device 172.

The controller 138 is arranged to interrogate the memory device 172 to determine whether a flag is present in the memory device. If a flag is found to be present, the controller 138 is arranged to read the previously set wavelength from the memory device. The controller 138 is further arranged to generate and transmit a wavelength control signal 140 arranged to set the transmission wavelength of the tunable optical filter 136 to the previously set wavelength.

The controller 138 is further arranged to generate and transmit an ONT control signal 174 arranged to cause the ONT transmitter 134 to commence transmission at said transmission wavelength.

If a flag is not present, the controller 138 is further arranged to sequentially generate and transmit one or more wavelength control signals 140 arranged to set the transmission wavelength of the tunable optical filter 136 to one or more wavelengths of the pre-selected plurality of transmission wavelengths until a wavelength is identified for which no downstream optical signal is detected.

Figure 16:
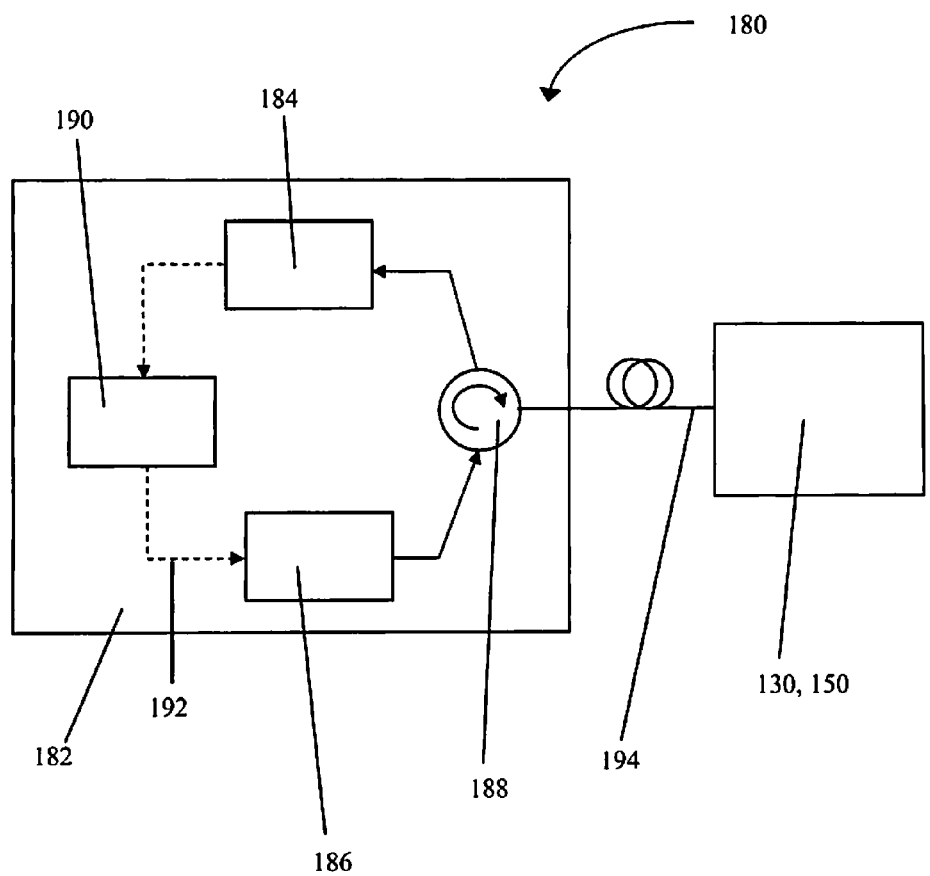
FIG. 16 is a diagrammatic representation of a WDM PON according to an eighteenth embodiment of the invention.

An eighteenth embodiment of the invention provides a WDM PON 180, as shown in FIG. 16. The WDM PON 180 comprises an ONT 130 or an ONT 150 as shown in FIGS. 11 and 12, an OLT 182 and an optical transmission network 194.

The OLT 182 comprises an optical receiver 184, an optical transmitter 186, and a further controller 190.

The optical receiver 184 is arranged to detect an upstream optical signal. The optical transmitter 186 is arranged to generate and transmit a downstream optical signal.

The further controller 190 is arranged to:

determine whether an upstream optical signal from the ONT 130, 150 has been detected;

if an upstream optical signal has been detected, generate a further downstream optical signal and transmit the further downstream optical signal to the ONT;

wait for a time at least as long as a round trip time from the OLT 182 to the ONT and back, and determine whether a further upstream optical signal has been received; and if a further upstream optical signal is determined to have been received, generate and transmit an OLT control signal 192 arranged to cause the OLT 182 to commence transmission of a traffic carrying downstream optical signal of the optical transmitter 186 at the transmission wavelength of the ONT 130, 150.

Figure 17:
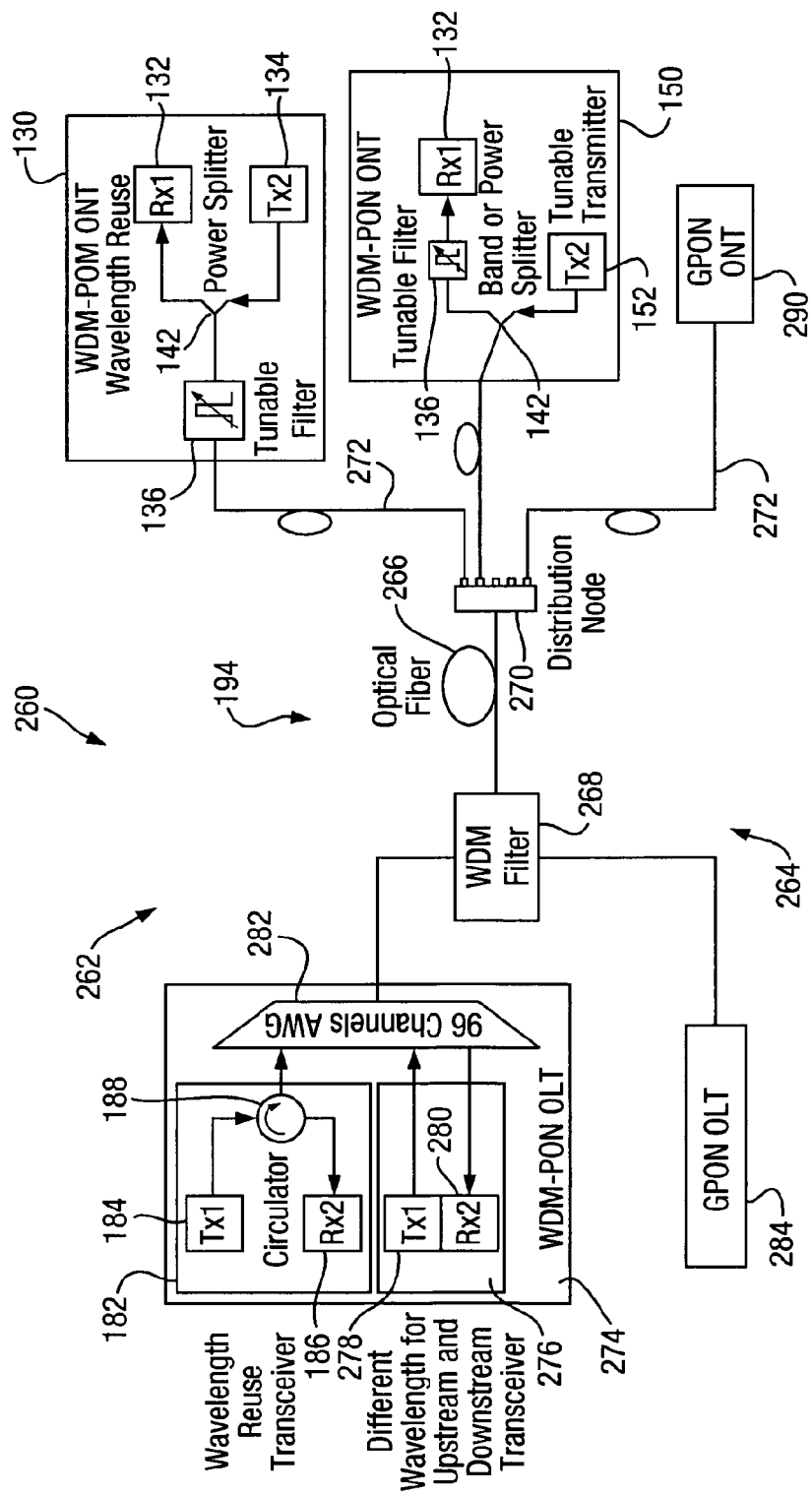
FIG. 17 is a diagrammatic representation of a WDM PON according to a nineteenth embodiment of the invention.

A PON 260 according to a nineteenth embodiment of the invention is shown in FIG. 17. The PON 260 comprises a WDM PON section 262 and a GPON section 264.

The WDM PON section 262 is similar to the WDM PON 180 shown in FIG. 16 with the following modifications. In this embodiment, the WDM PON section 262 comprises both a wavelength reuse based ONT 130, as shown in FIG. 11, and a tunable laser based ONT 150, as shown in FIG. 12.

The transmission network 194 comprises an optical fibre link 266, a WDM filter 268 at the OLT end and a distribution node 270 at the subscriber end. The ONTs 130, 150 are connected to the distribution node 270 through feeder fibres 272.

In this embodiment, the OLT 274 is similar to the OLT 182 of FIG. 16, with the following modifications. The first section of the OLT 182 is for communication with the wavelength reuse based ONT 130. The OLT 274 further comprises a second section 276 comprising second transmitter 278 and a second receiver 280 for use with the tunable laser based ONT 150. The two OLT sections 182, 274 are coupled to the WDM filter 268 through de-/multiplexer 282 which in this example comprises an arrayed waveguide grating, AWG.

The GPON section 264 comprises an OLT 284 coupled to the WDM filter 268 at the OLT end and an ONT 290 coupled to the distribution node 270 at the subscriber end.

The invention claimed is:

1. A method of configuring an optical network terminal of a wavelength division multiplexed passive optical network, the method comprising:
   a. sequentially setting a transmission wavelength of a tunable optical filter at the optical network terminal to one or more wavelengths of a pre-selected plurality of transmission wavelengths until a said wavelength is identified for which no downstream optical signal from an optical line terminal of the wavelength division multiplexed passive optical network is detected;
   b. determining whether a transmitter operable at said identified transmission wavelength is present at the optical line terminal and is available to be assigned to communicate with the optical network terminal;
   c. if a said transmitter is determined to be present and available, maintaining the transmission wavelength of the tunable optical filter at said identified transmission wavelength and assigning the optical network terminal to the optical line terminal as a subscriber at said identified transmission wavelength; and
   d. if a said transmitter is determined to be one of not present and not available, recommencing the method at step a. for one or more further wavelengths of said pre-selected plurality of wavelengths.

2. A method as claimed in claim 1, wherein step a. comprises:
   i. determining whether the optical network terminal has a previously set tunable optical filter transmission wavelength;
   ii. if there is a previously set wavelength, setting the transmission wavelength of the tunable optical filter to said previously set wavelength; and
   iii. if there is not a previously set wavelength, sequentially setting a transmission wavelength of a tunable optical filter at the optical network terminal to one or more wavelengths of a pre-selected plurality of transmission wavelengths until a said wavelength is identified for which no downstream optical signal from an optical line terminal of the wavelength division multiplexed passive optical network is detected; and step d. comprises, if a said transmitter is determined to be one of not present and not available, recommencing the method at step iii. for one or more further wavelengths of said pre-selected plurality of wavelengths.

3. A method as claimed in claim 1, wherein each of step a. and step iii. comprises sequentially setting the transmission wavelength of the tunable optical filter at the optical network terminal to one or more wavelengths of the pre-selected plurality of transmission wavelengths until the transmission wavelength is set to a said wavelength for which a first loss of signal alarm having a high alarm condition is received.

4. A method as claimed in claim 1, wherein step b. comprises:
   A. at the optical network terminal, generating an upstream optical signal and transmitting the upstream optical signal to the optical line terminal;
   B. at the optical line terminal, determining whether a said upstream optical signal has been detected, and if a said upstream optical signal has been detected generating a further downstream optical signal and transmitting the further downstream optical signal to the optical network terminal;
   C. at the optical network terminal, waiting for a time at least as long as a round trip time from the optical network terminal to the optical line terminal and back, and determining whether a said further downstream optical signal has been received; and
   D. if a said further downstream optical signal is determined to have been received, generating and transmitting a first control signal comprising an indication that said transmitter is present and available; and
   E. if no said further downstream optical signal is determined to have been received, generating and transmitting a second control signal comprising an indication that said transmitter is one of not present and not available.

5. A method as claimed in claim 4, wherein in step B., a said upstream optical signal is determined as having been detected if a second loss of signal alarm having a low alarm condition is received at the optical line terminal, and wherein in step C., a said further downstream optical signal is determined as having been received if a third loss of signal alarm having a low alarm condition is received at the optical network terminal.

6. A method as claimed in claim 4, wherein the upstream optical signal comprises an upstream identification modulation sequence and in step B. the upstream optical signal is detected by:
   at the optical line terminal, performing an autocorrelation of a received upstream optical signal with a stored upstream identification modulation sequence;
   generating an upstream autocorrelation indicator and comparing said indicator with an upstream threshold indicator; and
   if said indicator is greater than or equal to the upstream threshold indicator, generating a said further downstream optical signal comprising an indication that a said upstream optical signal has been detected.

7. A method as claimed in claim 3, wherein each said downstream optical signal comprises a downstream identification modulation sequence and each of step a., step iii. and step C. further comprise, if a respective loss of signal alarm having a high alarm condition is received:
   performing an autocorrelation of an optical signal received at the optical network terminal with a stored downstream identification modulation sequence;
   generating a downstream autocorrelation indicator and comparing said indicator with a downstream threshold indicator; and
   if said indicator is greater than or equal to the downstream threshold indicator, generating and transmitting a third control signal comprising an indication that said received optical signal comprises a downstream optical signal.

8. A method as claimed in claim 1, wherein step c. comprises:
   determining whether the optical network terminal has a previously set tunable optical filter transmission wavelength;
   if there is a previously set wavelength, at the optical network terminal maintaining the transmission wavelength of the tunable optical filter at said previously set wavelength and at the optical line terminal assigning the optical network terminal to the optical line terminal as a subscriber at said previously set wavelength;
   if there is not a previously set wavelength, further determining whether a transmitter operable at said identified transmission wavelength is present at the optical line terminal and is available to be assigned to communicate with the optical network terminal;
   if a said transmitter is determined to be present and available, storing said identified transmission wavelength, maintaining the transmission wavelength of the tunable optical filter at said identified transmission wavelength and at the optical line terminal assigning the optical network terminal to the optical line terminal as a subscriber at said identified transmission wavelength; and
   if a said transmitter is determined to be one of not present and not available, recommencing the method at step a. for one or more further wavelengths of said pre-selected plurality of wavelengths.

9. A method as claimed in claim 1, wherein step c. further comprises generating and transmitting at least one of an optical network terminal control signal configured to cause the optical network terminal to commence transmission of a traffic carrying upstream optical signal at said maintained transmission wavelength of the tunable optical filter and an optical line terminal control signal arranged to cause the optical line terminal to commence transmission of a traffic carrying downstream optical signal at said maintained transmission wavelength of the tunable optical filter.

10. A method as claimed in claim 9, wherein the upstream optical signal has a first bit rate and the optical network terminal control signal is further configured to cause the optical network terminal to commence transmission of a traffic carrying upstream optical signal at a second, higher bit rate.

11. A method as claimed in claim 1, wherein the optical network terminal comprises an optical transmitter comprising a tunable laser and wherein step c. further comprises generating and transmitting a laser wavelength control signal configured to cause the tunable laser to operate at said maintained transmission wavelength of the tunable optical filter.

12. An optical network terminal for a wavelength division multiplexed passive optical network, the optical network terminal comprising:
   an optical receiver configured to detect a downstream optical signal;
   an optical transmitter configured to generate and transmit an upstream optical signal;
   a tunable optical filter having a tunable transmission wavelength and being configured to receive a downstream optical signal and to transmit to the optical receiver any said received downstream optical signal at a selected said transmission wavelength; and a controller configured to:
- a. sequentially generate and transmit one or more wavelength control signals arranged to set the transmission wavelength of the tunable optical filter to a respective one or more wavelengths of a pre-selected plurality of transmission wavelengths until a said wavelength is identified for which no downstream optical signal is detected;
- b. determine whether a transmitter operable at said identified transmission wavelength is present at an optical line terminal of the wavelength division multiplexed passive optical network and is available to be assigned to communicate with the optical network terminal;
- c. if a said transmitter is determined to be present and available, maintain the transmission wavelength of the tunable optical filter at said identified transmission wavelength; and
- d. if a said transmitter is determined to be one of not present and not available, recommence step a. for one or more further wavelengths of said pre-selected plurality of wavelengths.

13. An optical network terminal as claimed in claim 12, wherein the downstream optical signal comprises a downstream identification modulation sequence and the optical network terminal further comprises autocorrelation apparatus provided after the optical receiver, the autocorrelation apparatus being configured to:

perform an autocorrelation of an optical signal received at the optical receiver with a stored downstream identification modulation sequence;

generate a downstream autocorrelation indicator and compare said indicator with a downstream threshold indicator; and if said indicator is greater than or equal to the downstream threshold indicator, generate and transmit a first control signal comprising an indication that said received optical signal comprises a downstream optical signal.

14. An optical network terminal as claimed in claim 12, wherein the optical network terminal further comprises a memory device configured to store an indicator indicating that the optical network terminal has a previously set tunable optical filter transmission wavelength, and the controller is configured: to i. interrogate the memory device to determine whether a said indicator is present in the memory device, ii. if a said indicator is present, obtain said previously set wavelength and set the transmission wavelength of the tunable optical filter to said previously set wavelength; and iii. if no said indicator is present, sequentially generate and transmit one or more wavelength control signals arranged to set the transmission wavelength of the tunable optical filter to a respective one or more wavelengths of the pre-selected plurality of transmission wavelengths until a said wavelength is identified for which no downstream optical signal is detected.

15. An optical network terminal as claimed in claim 12, wherein the controller is further configured to generate and transmit an optical network terminal control signal arranged to cause the optical network terminal to commence transmission of a traffic carrying upstream optical signal at said transmission wavelength.

16. An optical network terminal as claimed in claim 12, wherein the optical transmitter comprises a tunable laser and the controller is further configured to generate and transmit a laser wavelength control signal arranged to cause the tunable laser to operate at the transmission wavelength of the tunable optical filter.

17. A passive optical network comprising:
an optical network terminal comprising:
an optical receiver configured to detect a downstream optical signal;
an optical transmitter configured to generate and transmit an upstream optical signal;
a tunable optical filter having a tunable transmission wavelength and being configured to receive a downstream optical signal and to transmit to the optical receiver any said received downstream optical signal at a selected said transmission wavelength; and
a controller configured to:
- a. sequentially generate and transmit one or more wavelength control signals arranged to set the transmission wavelength of the tunable optical filter to a respective one or more wavelengths of a pre-selected plurality of transmission wavelengths until a said wavelength is identified for which no downstream optical signal is detected;
- b. determine whether a transmitter operable at said identified transmission wavelength is present at an optical line terminal of the wavelength division multiplexed passive optical network and is available to be assigned to communicate with the optical network terminal;
- c. if a said transmitter is determined to be present and available, maintain the transmission wavelength of the tunable optical filter at said identified transmission wavelength; and
- d. if a said transmitter is determined to be one of not present and not available, recommence step a. for one or more further wavelengths of said pre-selected plurality of wavelengths;

an optical line terminal comprising:
an optical receiver configured to detect an upstream optical signal;
an optical transmitter configured to generate and transmit a downstream optical signal; and
a further controller configured to:
determine whether an upstream optical signal from the optical network terminal has been detected;
if a said upstream optical signal has been detected, generate a further downstream optical signal and transmit the further downstream optical signal to the optical network terminal;
wait for a time at least as long as a round trip time from the optical line terminal to the optical network terminal and back, and determine whether a further upstream optical signal has been received; and
if a said further upstream optical signal is determined to have been received, generate and transmit an optical line terminal control signal configured to cause the optical line terminal to commence transmission at the transmission wavelength of the optical network terminal; and an optical transmission network connecting the optical network terminal to the optical line terminal.

* * * * *